(12) United States Patent
Dhanani et al.

(10) Patent No.: US 11,991,772 B2
(45) Date of Patent: May 21, 2024

(54) ENHANCED CELLULAR CONNECTIVITY VIA OPPORTUNISTIC EXTENSION OF RRC CONNECTED MODE

(71) Applicant: APPLE INC., Cupertino, CA (US)

(72) Inventors: Tarakkumar G. Dhanani, Cupertino, CA (US); Vijay Ventkataraman, Cupertino, CA (US); Karan R. Sachdev, Cupertino, CA (US); Neeraj D. Vaghela, Cupertino, CA (US); Raghuram Mungara, Cupertino, CA (US); Sharad Garg, Cupertino, CA (US); Vijay Gadde, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/811,366

(22) Filed: Jul. 8, 2022

(65) Prior Publication Data

US 2022/0346177 A1    Oct. 27, 2022

Related U.S. Application Data

(62) Division of application No. 16/905,620, filed on Jun. 18, 2020, now Pat. No. 11,464,065.

(51) Int. Cl.
*H04W 76/25* (2018.01)
*H04B 17/318* (2015.01)
(Continued)

(52) U.S. Cl.
CPC .......... *H04W 76/25* (2018.02); *H04B 17/318* (2015.01); *H04L 5/0051* (2013.01);
(Continued)

(58) Field of Classification Search
CPC ..... H04W 76/25; H04W 76/27; H04W 24/08; H04W 24/10; H04B 17/318; H04L 5/0051
(Continued)

(56) References Cited

U.S. PATENT DOCUMENTS 9,301,235 B2    3/2016   Hamilton
RE48,425 E  *   2/2021   Kiukkonen ....... H04W 52/0229
(Continued)

FOREIGN PATENT DOCUMENTS

CA    2775981 A1 *  7/2011 ............. G06Q 30/02
WO    2020154622 A1    7/2020

OTHER PUBLICATIONS

U.S. Appl. No. 16/905,620, Notice of Allowance, Jun. 6, 2022, 9 pages.
(Continued)

*Primary Examiner* — Mong-Thuy T Tran
(74) *Attorney, Agent, or Firm* — Dorsey & Whitney LLP

(57) ABSTRACT

Systems and methods for extending connectivity with a cellular network are disclosed herein. A UE may monitor a serving cell of the UE and a neighbor cell of the UE to determine whether there is a network condition wherein the UE is to transition to an out-of-service (OOS) state if it were to fall to a Radio Resource Control (RRC) Idle state. The UE may react by, before expiration of an inactivity period corresponding to a transition to an RRC Idle mode, initiating signaling activity with a radio access network (RAN) node of the serving cell. In other embodiments, the UE may determine, based on a number of secondary devices connected to the UE, to initiate signaling with the RAN node of the serving cell before expiration of an inactivity period and according to whether a maximum number of extensions of an extension activity period has been reached.

18 Claims, 13 Drawing Sheets

(51) Int. Cl.
  *H04L 5/00* (2006.01)
  *H04W 24/08* (2009.01)
  *H04W 24/10* (2009.01)
  *H04W 76/27* (2018.01)
(52) U.S. Cl.
  CPC ........... *H04W 24/08* (2013.01); *H04W 24/10* (2013.01); *H04W 76/27* (2018.02)
(58) Field of Classification Search
  USPC ........................................................ 370/329
  See application file for complete search history.

(56) References Cited

U.S. PATENT DOCUMENTS

| | | | |
|---|---|---|---|
| 11,178,618 B2* | 11/2021 | He | H04W 52/0216 |
| 11,284,352 B2 | 3/2022 | Ryu et al. | |
| 11,678,291 B2* | 6/2023 | Edge | H04W 4/02 |
| | | | 455/456.1 |
| 11,923,939 B2* | 3/2024 | Chen | H04B 7/0639 |
| 2010/0284388 A1* | 11/2010 | Fantini | H04W 48/18 |
| | | | 455/422.1 |
| 2013/0084858 A1 | 4/2013 | Ramasamy et al. | |
| 2014/0370893 A1* | 12/2014 | Srikrishna | H04W 48/02 |
| | | | 455/435.2 |
| 2015/0092708 A1 | 4/2015 | Su et al. | |
| 2015/0126206 A1 | 5/2015 | Krishnamurthy et al. | |
| 2015/0229604 A1* | 8/2015 | Pal | H04L 61/5038 |
| | | | 370/254 |
| 2015/0304955 A1* | 10/2015 | Manepalli | H04W 76/28 |
| | | | 370/311 |
| 2016/0198384 A1 | 7/2016 | Jung et al. | |
| 2016/0345217 A1 | 11/2016 | Tabet et al. | |
| 2017/0019831 A1* | 1/2017 | Ady | H04W 72/121 |
| 2017/0118680 A1 | 4/2017 | Zhu et al. | |
| 2017/0142741 A1 | 5/2017 | Kaur et al. | |
| 2018/0332486 A1 | 11/2018 | Arab et al. | |
| 2018/0343686 A1* | 11/2018 | Manepalli | H04W 76/28 |
| 2019/0097874 A1* | 3/2019 | Zhou | H04L 5/0023 |
| 2019/0174344 A1* | 6/2019 | Karella | H04W 24/10 |
| 2019/0246435 A1* | 8/2019 | Hummel | G06F 3/04847 |
| 2019/0306754 A1* | 10/2019 | Shan | H04W 8/06 |
| 2019/0319686 A1 | 10/2019 | Chen et al. | |
| 2020/0260384 A1 | 8/2020 | Ryu et al. | |
| 2020/0274657 A1 | 8/2020 | Deenoo et al. | |
| 2020/0275474 A1* | 8/2020 | Chen | H04L 1/1848 |
| 2020/0382992 A1* | 12/2020 | Shilov | H04W 72/20 |
| 2021/0153068 A1* | 5/2021 | Zee | H04W 48/12 |
| 2021/0274468 A1 | 9/2021 | Wang et al. | |
| 2021/0337464 A1* | 10/2021 | Gupta | H04W 4/027 |
| 2021/0337481 A1* | 10/2021 | Goel | H04W 52/0229 |

OTHER PUBLICATIONS

U.S. Appl. No. 16/905,620, Final Office Action, Mar. 18, 2022, 11 pages.
U.S. Appl. No. 16/905,620, Non-Final Office Action, Nov. 26, 2021, 10 pages.

* cited by examiner

| Index | System_Time | Summary | Extra Info by Script |
|---|---|---|---|
| 42116 | 01:06:47.978 | rrcConnectionRelease | 4G DL_DCCH: rrcConnectionRelease, cause:other |
| 50926 | 01:06:48.032 | ACQUISITION_SUCCESS | camped on LTE 310/410(US/AT&T); Band:LTE_BAND_30 |
| 61675 | 01:06:49.624 | Paging | 4G PCCH: paging |
| 64028 | 01:06:49.656 | rrcConnectionRequest | 4G UL_CCCH: rrcConnectionRequest, cause:mt_Access |
| 68502 | 01:06:49.705 | ERRC_STATE_REPORT_IND | LTE: CONNECTED |
| 82607 | 01:06:49.817 | L1E_SCELL_MEASUREMENT_IND | earfcn: 9820(B30), pci:416, rsrp_dBm:-117.8 (-119.2,-120.5,-117.8,-118.7), rsrq_dB:-13.1 (-18.7,-16.7,-15.2,-18.2), snr_dB: 7 |
| 85320 | 01:06:49.838 | IMS_Call_State | IMS_CALL_STATE_MT_INVITE |
| 85347 | 01:06:49.839 | CsiSipMessageInjectToCpTrace | INCOMING, msg:INVITE sip:[2600:380:87a6:f17f:10b4:52c8:c730:b673]:49170, event:INCOMING_SESSION |
| 85380 | 01:06:49.839 | IMS_Call_State | IMS_CALL_STATE_MT_INVITE |
| 88540 | 01:06:49.859 | L1E_SCELL_MEASUREMENT_IND | earfcn: 9820(B30), pci:416, rsrp_dBm:-109.2 (-114.3,-121.8,-118.7,-109.2), rsrq_dB:-11.3 (-11.2,-17.2,-11.1,-15.5), snr_dB: 13 |
| 95725 | 01:06:49.913 | ACTIVATE_DEDICATED_EPS_BEARER_CONTEXT_RE... | 4G ENAS ESM: ENAS_ACTIVATE_DEDICATED_EPS_BEARER_CONTEXT_REQUEST, EB=7, Linked EBI=6; |
| 97287 | 01:06:49.925 | ACTIVATE_DEDICATED_EPS_BEARER_CONTEXT_AC... | 4G ENAS ESM: ENAS_ACTIVATE_DEDICATED_EPS_BEARER_CONTEXT_ACCEPT |
| 114113 | 01:06:50.114 | IMS_Call_State | IMS_CALL_STATE_RINGING |
| 114175 | 01:06:50.115 | IMS_Call_State | IMS_CALL_STATE_RINGING |
| 318028 | 01:06:52.902 | IMS_Call_State | IMS_CALL_STATE_ESTABLISHED |
| 318068 | 01:06:52.903 | IMS_Call_State | IMS_CALL_STATE_ESTABLISHED |
| 1390288 | 01:07:03.398 | IMS_Call_State | IMS_CALL_STATE_DISCONNECTED |
| 1390347 | 01:07:03.399 | IMS_Call_State | IMS_CALL_STATE_DISCONNECTED |
| 1412019 | 01:07:03.564 | DEACTIVATE_EPS_BEARER_CONTEXT_REQUEST | 4G ENAS ESM: ENAS_DEACTIVATE_EPS_BEARER_CONTEXT_REQUEST |
| 1413138 | 01:07:03.571 | DEACTIVATE_EPS_BEARER_CONTEXT_ACCEPT | 4G ENAS ESM: ENAS_DEACTIVATE_EPS_BEARER_CONTEXT_ACCEPT |
| 2110357 | 01:07:24.426 | L1E_SCELL_MEASUREMENT_IND | earfcn: 9820(B30), pci:416, rsrp_dBm:-124.3 (-131.8,-130.6,-130.6,-126.1), rsrq_dB:-15.6 (-18.1,-19.1,-18.1,-15.5), snr_dB: -2 |
| 2117429 | 01:07:24.504 | L1E_SCELL_MEASUREMENT_IND | earfcn: 9820(B30), pci:416, rsrp_dBm:-125.9 (-131.8,-128.0,-128.8,-125.9), rsrq_dB:-15.6 (-19.4,-16.5,-16.4,-15.8), snr_dB: -3 |
| 2120972 | 01:07:24.543 | L1E_SCELL_MEASUREMENT_IND | earfcn: 9820(B30), pci:416, rsrp_dBm:-126.1 (-130.6,-130.6,-130.6,-126.1), rsrq_dB:-15.6 (-18.1,-19.1,-18.1,-15.5), snr_dB: -5 |

FIG. 1A

| Index | System_Time | _Summary | Extra Info by Script |
|---|---|---|---|
| 2125993 | 01:07:24.851 | rrcConnectionRelease | 4G DL_DCCH: rrcConnectionRelease, cause:other |
| 2149371 | 01:07:24.191 | ERRC_TRACE_CELL_SUITABILITY | si_missing_requirement=0x10 cell_status=E_ERRC_SI_STATUS_BAD error_code=E_ERRC_SI_S_CRITERIA_FAIL |
| 2150492 | 01:07:25.201 | ERRC_ACT_FAIL_IND | |
| 2150493 | 01:07:25.201 | ERRC_STATE_REPORT_IND | LTE: INACTIVE |
| 2150497 | 01:07:25.201 | ACQUISITION_FAILURE | fail to camp on LTE, cause:MMRRC_NO_CELL_SCAN_CMPL_AS stops cell search |
| 2167715 | 01:07:25.504 | ACQUISITION_FAILURE | LTE; scanCompleted:no; no PLMN found |
| 2199570 | 01:07:26.070 | ACQUISITION_FAILURE | LTE; scanCompleted:yes; no PLMN found |
| 2218024 | 01:07:26.405 | ACQUISITION_FAILURE | LTE; scanCompleted:no; no PLMN found |
| 2274515 | 01:07:31.797 | ACQUISITION_FAILURE | LTE; scanCompleted:no; no PLMN found |

FIG. 1B

| Index | System_Time | Summary | Extra Info by Script |
|---|---|---|---|
| 77899 | 01:06:42.259 | IMS_Call_State | IMS_CALL_STATE_MT_INVITE |
| 100156 | 01:06:42.558 | ACTIVATE_DEDICATED_EPS_BEAR ER_CONTEXT_RE... | 4G ENAS ESM: ENAS_ACTIVATE_DEDICATED_EPS_BEARER_CONTEXT_REQUEST, EB=7, Linked_EBI=6; |
| 100603 | 01:06:42.560 | ACTIVATE_DEDICATED_EPS_BEAR ER_CONTEXT_AC... | 4G ENAS ESM: ENAS_ACTIVATE_DEDICATED_EPS_BEARER_CONTEXT_ACCEPT |
| 107620 | 01:06:42.654 | SIP/2.0 200 OK | |
| 107901 | 01:06:42.656 | SIP/2.0 180 RINGING | |
| 107902 | 01:06:42.656 | IMS_Call_State | IMS_CALL_STATE_RINGING |
| 288871 | 01:06:45.372 | IMS_Call_State | IMS_CALL_STATE_ESTABLISHED |
| 1290090 | 01:06:56.369 | BYE sip:lucentNGFS-239424@[200 | |
| 1290091 | 01:06:56.370 | IMS_Call_State | IMS_CALL_STATE_DISCONNECTED |
| 1316964 | 01:06:56.635 | DEACTIVATE_EPS_BEARER_CONT EXT_REQUEST | 4G ENAS ESM: ENAS_DEACTIVATE_EPS_BEARER_CONTEXT_REQUEST |
| 1317470 | 01:06:56.637 | DEACTIVATE_EPS_BEARER_CONT EXT_ACCEPT | 4G ENAS ESM: ENAS_DEACTIVATE_EPS_BEARER_CONTEXT_ACCEPT |

| Index | System Time | Summary | Extra Info by Script |
|---|---|---|---|
| 2336063 | 01:07:21.937 | INVITE sip:[2600:380:85d5:b7d2 | |
| 2336064 | 01:07:21.937 | IMS_Call_State | IMS_CALL_STATE_MT_INVITE |
| 2338053 | 01:07:21.958 | SIP/2.0 183 Session Progress | |
| 2364750 | 01:07:22.270 | IMS_Call_State | IMS_CALL_STATE_RINGING |
| 2441353 | 01:07:23.288 | L1E_SCELL_MEASUREMENT_IND | earfcn: 9820(B30), pci:416, rsrp_dBm:-129.4 (-130.1,-131.8,-129.5,-129.4), rsrq_dB:-16.8 (-17.1,-19.3,-17.0,-18.1), snr_dB:-6 |
| 2500121 | 01:07:24.128 | L1E_SCELL_MEASUREMENT_IND | earfcn: 9820(B30), pci:416, rsrp_dBm:-129.1 (-130.3,-130.6,-129.1,-130.3), rsrq_dB:-16.9 (-17.6,-18.8,-16.6,-19.3), snr_dB:-6 |
| 2511148 | 01:07:24.288 | L1E_SCELL_MEASUREMENT_IND | earfcn: 9820(B30), pci:416, rsrp_dBm:-129.2 (-129.7,-130.7,-129.2,-130.6), rsrq_dB:-17.0 (-17.4,-19.5,-17.1,-20.1), snr_dB:-6 |
| 2570810 | 01:07:25.042 | IMS_Call_State | IMS_CALL_STATE_ESTABLISHED |
| 2574491 | 01:07:25.074 | L1E_SCELL_MEASUREMENT_IND | earfcn: 9820(B30), pci:416, rsrp_dBm:-129.3 (-130.3,-131.4,-129.3,-130.7), rsrq_dB:-15.6 (-17.3,-19.1,-16.8,-19.4), snr_dB:-6 |
| 2586027 | 01:07:25.193 | L1E_SCELL_MEASUREMENT_IND | earfcn: 9820(B30), pci:416, rsrp_dBm:-129.5 (-130.4,-132.7,-129.5,-130.4), rsrq_dB:-17.4 (-18.1,-21.4,-17.6,-20.0), snr_dB:-6 |
| 3570455 | 01:07:35.183 | IMS_Call_State | IMS_CALL_STATE_DISCONNECTED |
| 3622420 | 01:07:35.676 | DEACTIVATE_EPS_BEARER_CONT EXT_REQUEST | 4G ENAS ESM: ENAS_DEACTIVATE_EPS_BEARER_CONTEXT_REQUEST |
| 3622764 | 01:07:35.678 | DEACTIVATE_EPS_BEARER_CONT EXT_ACCEPT | 4G ENAS ESM: ENAS_DEACTIVATE_EPS_BEARER_CONTEXT_ACCEPT |
| 5363790 | 01:08:03.438 | ERRC_STATE_REPORT_IND | LTE: CONNECTED |
| 5628831 | 01:08:06.538 | ERRC_STATE_REPORT_IND | LTE: CONNECTED |

FIG. 2B

ENHANCED CELLULAR CONNECTIVITY VIA OPPORTUNISTIC EXTENSION OF RRC CONNECTED MODE

TECHNICAL FIELD

This application relates generally to wireless communication systems, and more specifically to opportunistically extending an RRC Connected mode at a UE.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a log of a UE corresponding to RRC Idle mode considerations, according to an embodiment.

FIG. 1B illustrates a continuation of the log of FIG. 1A.

FIG. 2A illustrates a log of a UE corresponding to RRC Connected mode considerations, according to an embodiment.

FIG. 2B illustrates a continuation of the log of FIG. 2A.

DETAILED DESCRIPTION

Figure 3:
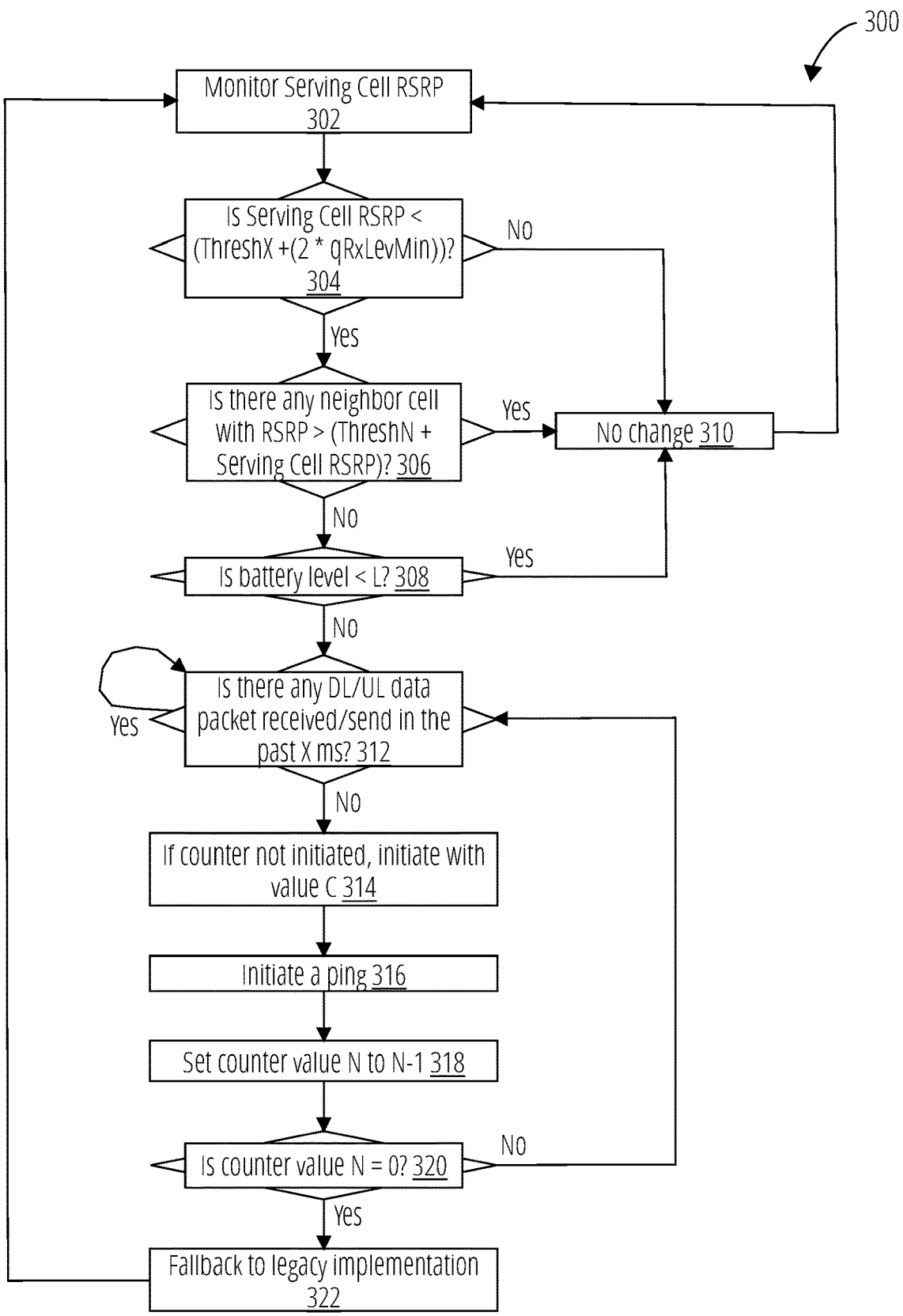
FIG. 3 illustrates a method of a UE for initiating signaling activity with a RAN node in order to remain in RRC Connected mode, according to an embodiment.

In some systems, a UE in Radio Resource Control (RRC) Idle mode monitors a reference signal received power (RSRP) of a serving cell for the UE (e.g., the currently camped serving cell). If this RSRP drops below a threshold, the UE may reselect to another serving cell of a same or different RAT (if available). In these systems, relevant threshold may be, e.g., 2*qRxLevMin, where qRxLevMin is a minimum required RSRP measurement of the current serving cell as set by a RAN node of the serving cell. Otherwise (if another serving cell of a same or different RAT is not available), the UE declares that it is out of service (OOS). To come back into service, the UE searches for available serving cells on various RATs that meet a minimum camping threshold (which may be, e.g., the same 2*qRxLevMin threshold discussed above) in order to camp back on the network. If these conditions are not met then the UE continues to be in OOS.

Further, because the UE may not continuously transmit and/or receive to and/or from the network, it can fall (e.g., be placed by the RAN node) from an RRC Connected mode into an RRC Idle mode or RRC Inactive mode. This may occur once, for example, an inactivity period (e.g., a period during which there is not any downlink (DL) and/or uplink (UL) data on the channel between the UE and the RAN node) that is measured by an inactivity timer passes. Some systems may be equipped with such an inactivity timer at one or more of the UE and/or the RAN node. In some systems, the inactivity period is around five to ten seconds. Once in RRC Idle mode, the criteria for the UE to declare the OOS condition is based on dropping below a threshold (e.g., 2*qRxLevmin), as discussed above. However, this threshold may not represent the actual cutoff of the physical capability of the UE to decode and/or transmit messages from and/or to the network.

In these systems, it may be that a UE placed in RRC Idle mode (e.g., as described above) has a higher chance of going to OOS than a similarly situated UE that is instead in RRC Connected mode. This may be because the criteria for a UE in RRC Connected mode to declare OOS (e.g., in a scenario where the UE has sent and/or received data to and/or from the RAN node and an inactivity period has not yet been measured) is different compared to when the UE is in RRC Idle mode. A UE in RRC Connected mode stays in RRC Connected mode until it has a Radio Link Failure (RLF) and is unable to recover from the RLF. The criteria for a RLF may not align with the threshold corresponding to declaring OOS from RRC Idle mode as discussed above (e.g., the RLF criteria may not be met unless a signal measurement weaker than 2*qRxLevMin is in effect at the serving cell of the UE). This gives the UE in RRC Connected mode the opportunity to stay in service (e.g., make and/or receive calls or decode and/or transmit other data) longer than an analogously situated UE that has been allowed to fall to/been placed in an RRC Idle mode.

FIG. 1A illustrates log 102 of a UE corresponding to RRC Idle mode considerations, according to an embodiment. The log 102 includes log entries 104 corresponding to the end of a phone call (e.g., voice over LTE (VoLTE) call). The log 102 further includes log entries 106 corresponding to a period of inactivity (where no data is being transferred between the UE and the RAN node of a serving cell of the UE). During this period of inactivity, an RSRP of the serving cell is measured at various times, with results in the −124.3 dBm through −126.1 dBm range.

FIG. 1B illustrates a continuation of the log 102 of FIG. 1A. The log 102 further includes the log entry 108, where the RRC connection is released by the RAN node due to the expiration of the inactivity period discussed in relation to log entries 106, and the UE accordingly switches to an RRC Idle mode. The log 102 further includes the log entry 110, where the UE declares that it is OOS. This may be based on the fact that the S_Criteria (e.g., the 2*qRxLevMin value discussed above) for the serving cell that is used when in RRC Idle mode is greater than the one or more RSRP measurements of the serving cell (e.g., is greater than a value in or around the range of −124.3 dBm through −126.1 dBm, as was measured corresponding to the log entries 106). The log 102 further includes the log entries 112, where the UE scans for (and fails to find) another cell (e.g., of a different RAT) to camp on. Due to this failure, the UE retains its OOS status.

FIG. 2A illustrates a log 202 of a UE corresponding to RRC Connected mode considerations, according to an embodiment. The UE of log 202 may be similarly situated to the UE of the log 102. The log 202 includes log entries 204 corresponding to the end of a first phone call (e.g., VoLTE call).

FIG. 2B illustrates a continuation of the log 202 of FIG. 2A. The log 202 may further include the log entries 206 corresponding to a second phone call received at the UE after the first phone call (and RSRP measurements taken during that same time period). This second phone call represents activity between the UE and the RAN node of the serving cell, and accordingly there is no release by the RAN node of the RRC connection due to inactivity. Accordingly, the UE of the log 202 remains in an RRC Connected mode (as opposed to falling into an RRC Idle mode, as in the UE of the log 102. Further, the RRC Connected mode is maintained due to this activity even though the RSRP of the serving cell measured during the period of the log entries 206 is in the range of −129.5 dBm through −129.1 dBm, which is a weaker signal than any of the measurements taken during the log entries 106 of the log 102. The log 202 further includes the log entry 208, showing that the UE of the log 202 further remains in connected mode for at least some time period after the second call of log entries 206.

In sum, due to the activity of the second call, the UE of the log 202 remains in RRC Connected mode (and thus has not dropped to OOS from an RRC Idle mode due to the weak RSRP of the serving cell). The UE of the log 202 can therefore still make and/or receive calls or decode and/or transmit other data), at least for a longer period as compared generally to the UE of the log 102. This may provide the user of the UE of the log 202 with a more robust, reliable service as compared to the UE of the log 102 (e.g., by extending the period by which to make and/or receive calls or decode and/or transmit other data for a longer period relative to the UE of the log 102). Accordingly, a solution to keep a UE in an RRC Connected mode for a longer period of time when the UE is in, for example, a weak serving cell and/or neighbor cell RSRP conditions may be desirable.

While the example illustrated in FIG. 2A and FIG. 2B used a second incoming call to illustrate advantages of continued data transfer activity on the channel between the UE and the RAN node, it may not necessarily be the case that this occurs (and in any case requires active user intervention to, e.g., answer the call to see the full benefit). Accordingly, it may be advantageous to, under certain conditions, configure the UE to initiate signaling activity with (e.g., pinging or otherwise sending uplink data to) a RAN node of a serving cell in order to similarly prevent the expiration of the relevant inactivity period (e.g., as tracked by an inactivity timer at the RAN node and/or the UE). In some instances, keeping the inactivity period from expiring via this signaling activity prevents the UE from falling to an RRC Idle state, and from there to an OOS state, when the criteria for remaining camped on the serving cell while in the RRC Idle mode (e.g., the S_Criteria of 2*qRxLevMin described above) is not met. Examples of data and/or message types that may be used to generate such signaling activity may include, but are not necessarily limited to, an ICMP ping packet, a dummy PDCP PDU, or an uplink NAS signaling message (e.g., a Tracking Area Update). It may be that no particular substantive content is necessary to include in the signaling activity so used.

FIG. 3 illustrates a method 300 of a UE for initiating signaling activity with a RAN node in order to remain in RRC Connected mode, according to an embodiment. The UE using the method 300 may currently be in an RRC Connected mode.

The method 300 includes the block 302, wherein an RSRP of a serving cell of the UE is monitored. The serving cell of the UE may be the cell that the UE is currently camped on (e.g., is using or has most recently used to make and/or receive calls or decode and/or transmit other data).

From block 302, the method 300 proceeds to the decision block 304. In the decision block 304, an RSRP measurement of the serving cell is compared to a serving cell RSRP threshold value. The serving cell RSRP threshold value may be calculated using the formula ThreshX+(2*qRxLevMin), where qRxLevMin is a minimum specified RSRP measurement of the serving cell as set by the RAN node of the serving cell, and where ThreshX is a serving cell RSRP threshold buffer amount.

The above formula is designed to result in a value that is higher by ThreshX than the 2*qRxLevMin value that is used when the UE is in RRC Idle mode to determine whether the UE is to declare itself OOS. The serving cell RSRP threshold value as calculated using the above formula may then be compared to the RSRP of the serving cell to determine whether the RSRP of the serving cell is less than the serving cell RSRP threshold value. If the RSRP measurement of the serving cell is less than the serving cell RSRP threshold value, then it can be concluded that the serving cell RSRP measurement is at least approaching (if it has not already achieved) a condition that will cause the UE to go OOS should it enter an RRC Idle mode. Accordingly, the method 300 proceeds to the decision block 306 to further evaluate whether signaling activity with the RAN node should be initiated in order to avoid this possible outcome.

Otherwise (e.g., if the RSRP of the serving cell is greater than or equal to the serving cell RSRP threshold value), it may be concluded that the RSRP measurement is not approaching a condition that will cause the UE to go OOS should it enter RRC Idle mode, in which case the method 300 proceeds to the block 310, where no change from the current UE behavior definition (e.g., no extra signaling activity) occurs.

In the decision block 304, an RSRP measurement of one or more neighbor cells is compared to a neighbor cell RSRP threshold value. The neighbor cell RSRP threshold value may be calculated using the formula ThreshN+Serving Cell RSRP, where Serving Cell RSRP is an RSRP measurement of the serving cell (e.g., as taken in block 302), and where ThreshN is a neighbor cell RSRP threshold buffer amount.

The above formula is designed to result in a value that is higher by ThreshN than the RSRP of the serving cell of the UE (the serving cell upon which the UE is currently camped). The neighbor cell RSRP threshold value as calculated using the above formula may then be compared to the RSRP of a neighbor cell to determine whether the RSRP of the neighbor cell is greater than the neighbor cell RSRP threshold value. If the RSRP measurement of the neighbor cell is not greater than the neighbor cell RSRP threshold value, then it can be concluded that the neighbor cell is not likely to be available as a fall back serving cell should the UE enter an RRC Idle mode and attempt to camp on the neighbor cell to avoid going OOS (meaning that the UE may ultimately eventually fall OOS).

Otherwise (e.g., if the RSRP of the neighbor cell is greater than the neighbor cell RSRP threshold value), it may be concluded that the RSRP measurement of the neighbor cell is at least somewhat likely to be high enough to enable the UE to camp on the neighbor cell should the UE fall to RRC Idle mode and fail to remain on its current serving cell (e.g., due to the RSRP of the current serving cell being less than 2*qRxLevMin for the current serving cell, as described above).

Note that the use of ThreshN in the above formula for the neighbor cell RSRP threshold value ensures that the neighbor cell RSRP is better than the serving cell RSRP by at least the given amount (making it more likely that the neighbor cell will be available for camping as described above). This may be helpful in the case where the UE is unaware of, for example, a qRxLevMin value corresponding to the neighbor cell and thus some other basis for evaluating the neighbor cell RSRP measurement is needed.

If no neighbor cell has an RSRP that is greater than the neighbor cell RSRP threshold value, the method 300 proceeds to the decision block 308 to further evaluate whether a signaling of the RAN node should be initiated in order to avoid a possible OOS outcome. A determination that any one or more of the neighbor cells has an RSRP that is greater than the neighbor cell RSRP threshold value (and that accordingly an eventual OOS outcome is at least relatively unlikely) may cause the method 300 to proceed instead to the block 310 where no change from a current UE behavior definition (e.g., no extra signaling activity) occurs.

In the decision block 308, the UE makes a battery level measurement of a battery of the UE. This battery level measurement is then compared to a battery level threshold L. If the battery level of the UE is not less than the battery level threshold L, then it can be concluded that signaling activity with the RAN node (which takes more power than simply allowing the UE to drop to RRC Idle mode) may be performed. Accordingly, the method 300 proceeds to the decision block 312 to further evaluate whether signaling activity with the RAN node should be initiated. If the battery level of the UE is less than the battery level threshold L, then it can be concluded that signaling activity with the RAN node should not be initiated (due to the accompanying power expenditure that will be necessary). In this case, the method 300 proceeds instead to the block 310 where no change from a current UE behavior definition (e.g., no extra signaling activity) occurs. In certain circumstances where battery charge is not/is less of a concern (e.g., when the UE is currently connected to an outside power supply), the decision block 308 may be optional (e.g., may be skipped, with the method 300 proceeding from the decision block 306 to the decision block 312).

The block 310 may represent no change, from, for example, a legacy implementation. Accordingly, an inactivity timer may be allowed to expire, and the UE may fall from (e.g., be placed in) the RRC Idle mode and (if corresponding network conditions are present, as described above) declare itself in an OOS state. From block 310, the method 300 returns to the block 302.

In the decision block 312, the UE determines whether any downlink DL and/or UL data packet (e.g., any user data and/or any signaling packet) has been received from and/or sent to the RAN node of the serving cell during a pre-determined period of time of duration X (which may be measured in milliseconds). This predetermined period may be measured backwards from the current time. This pre-determined period of time may be a smaller period of time than the inactivity period measured by an inactivity timer used to determine whether to place the UE in an RRC Idle mode, as discussed above; this prevents the UE from transitioning into the RRC Idle mode prior to the expiration of the pre-determined period (note that the inactivity period monitored by the inactivity timer will reset whenever DL and/or UL data is transmitted in the channel). This pre-determined period of time may be monitored by referring to, e.g., an inactivity timer of the UE, if such is present on the UE, or by monitoring another timer of the UE. If there has been any DL and/or UL packet received from and/or sent to the RAN node of the serving cell during the pre-determined period, the method 300 continues to repeat this check by returning again to the decision block 312. Once there has not been any DL and/or UL packet received from and/or sent to the RAN node of the serving cell during the pre-determined period, the method 300 proceeds to the block 314.

In the block 314, the UE initiates a counter with a value C (if the counter is not already initiated). If the counter is already initiated, the block 314 is simply skipped. The method 300 then proceeds to the block 316.

In the block 316, a ping is initiated by the UE. A ping may be message and/or data generated by the UE for transmission to the RAN node of the serving cell. The purpose of the transmission of this message is to present UL data on the channel between the UE and the RAN node, which will cause an inactivity timer at either/both of the UE and/or the RAN node to reset. In this fashion, the UE prevents an inactivity period from being measured by such inactivity timer. As discussed above, examples of possible data and/or messages used for this purpose include an ICMP ping packet (as illustrated in the block 316), but could also and/or alternatively include a dummy PDCP PDU, an uplink NAS signaling message (e.g., a Tracking Area Update), etc. It may be that no particular substantive content is included in the message, as this may not be strictly necessary where the need is simply to present UL data on the channel. Due to the transmission of the data and/or message, the UE does not fall to (e.g., get placed into by the RAN node) the RRC Idle mode due to inactivity. The method 300 then proceeds to the block 318.

In the block 318, the counter value is changed, in that the counter value is decremented from N to a value of N−1 (note that N (prior to being decremented) may be equal to C if the counter value has not yet been changed after an initialization as in the block 314). The method 300 then proceeds to the decision block 320.

In the decision block 320, the UE determines whether the counter has reached a final value of zero. If the final value has been reached, the method 300 proceeds to the block 322. If the final value has not been reached, the method 300 returns to the decision block 312 resulting in another ping (or other message) corresponding to the block 316 at some point after another pre-determined period of time with no DL and/or UL data packet received by and/or sent to the RAN node as in the decision block 312, thereby continuing to extend the time that the UE remains in an RRC Connected mode.

FIG. 3 has illustrated just one possible example of the use of a counter as related to signaling activity with a RAN node in order to cause the UE to remain in RRC Connected mode. As is shown, the counter of the embodiment of FIG. 3 counts an initialized value down to final value of zero, but other counter types may be used (e.g., counters with final values other than zero, counters that count up to a final value instead of down to a final value, etc.); these are intended to come within the scope of this disclosure. Further, an order of 1) a check to a counter as in the decision block 320, 2) an initiation of a ping (or other instance of signaling activity) as in block 316, and 3) a modification of the counter value as in decision block 320 may occur in an alternative order than that specifically presented in FIG. 3.

Accordingly to the above, the modification of a value of the counter N may correspond to (e.g., by being before or after) a portion of the signaling activity with the RAN node of the serving cell. Further, in many cases, the UE may perform a portion of the signaling activity with the RAN node in response to a (prior) determination that the value of the counter has not reached a final value.

The elements of the method 300 from decision block 312 through the decision block 320 (including any repetitions thereof according to the illustrated loopback between the decision block 320 and the decision block 312) taken together may represent a single "extension" as discussed herein. In some embodiments, the elements from the decision block 312 through the decision block 320 may be replaced by a single instance of signaling (without the loopback and/or counter feature). In these cases, the single instance of signaling may represent a single "extension" as discussed herein.

In block 322, the UE falls back to a legacy implementation. This means that after the transition to block 322 as described above, the UE will no longer continue the signaling activity with the RAN node with the purpose of remaining in the RRC Connected mode (as in block 316), an inactivity timer may be allowed to expire (assuming that no other UL and/or DL data occurs on the channel between the UE and the RAN node), and the UE may fall from (e.g., be placed in) the RRC Idle mode and eventually (if corresponding network conditions are present) declare itself in an OOS state. The method 300 then returns to the block 302.

The description of FIG. 3 above has assumed that the method 300 was being performed by a UE that is in an RRC Connected mode. However, it should be understood that the method 300 may also be performed by a UE that has already been placed in the RRC Idle mode (e.g., prior to the UE declaring itself OOS). In this case, the first instance of the ping (or other message) of block 316 will cause the UE to be placed back in the RRC Connected mode, thereby extending the amount of time that the UE is in RRC Connected mode, with the benefits (e.g., avoiding declaring itself OOS) as described above. Further, as the UE in this case is already in RRC Idle mode, the predetermined period of the decision block 312 that is used in the first instance (e.g., prior to the UE returning to the RRC Connected mode corresponding to the block 316) may be, e.g., a predetermined period that is shorter than the time left before the UE declares itself OOS (rather than being a predetermined period that determined based on, e.g., an inactivity timer of the UE and/or the RAN node).

When performing the method 300 with a UE in RRC Idle mode, there a power trade off, as there is a fixed power cost for UE to transition from RRC Idle mode to RRC Connected mode. Accordingly, it may be desirable that a UE in RRC Idle mode perform the method 300 only when it is connected to a power source (e.g., being charged).

Another scenario where opportunistically extending RRC Connected mode may be useful is a scenario where a UE is connected to secondary device (e.g., a device using the UE as a personal hotspot). A secondary device may connect to the UE and use the UE's cellular link for internet connectivity. In some cases, the use of a personal hotspot tends to follow a pattern of heavy traffic followed by bursty and trickling traffic. This may be more predominant when more than one secondary device is connected to the UE. In these cases, the RRC state of the UE frequently transitions between RRC Idle and RRC Connected. By (at least sometimes) opportunistically extending RRC Connected mode in these situations, the bursty and or trickling traffic may have a better chance of being handled when the UE is (still) in RRC Connected mode (as opposed to the UE first falling to RRC Idle mode and having to return the RRC Connected mode in order to handle this traffic, which delays the handling of the traffic). An additional benefit is also reducing the number of times the UE transitions for RRC Idle to RRC Connected mode.

Accordingly, it may be advantageous, when one or more secondary devices are connected to the UE, to (at least sometimes) extend the RRC Connected mode, which may reduce the number of transitions from RRC Connected mode to RRC Idle mode (or vice versa).

Figure 4:
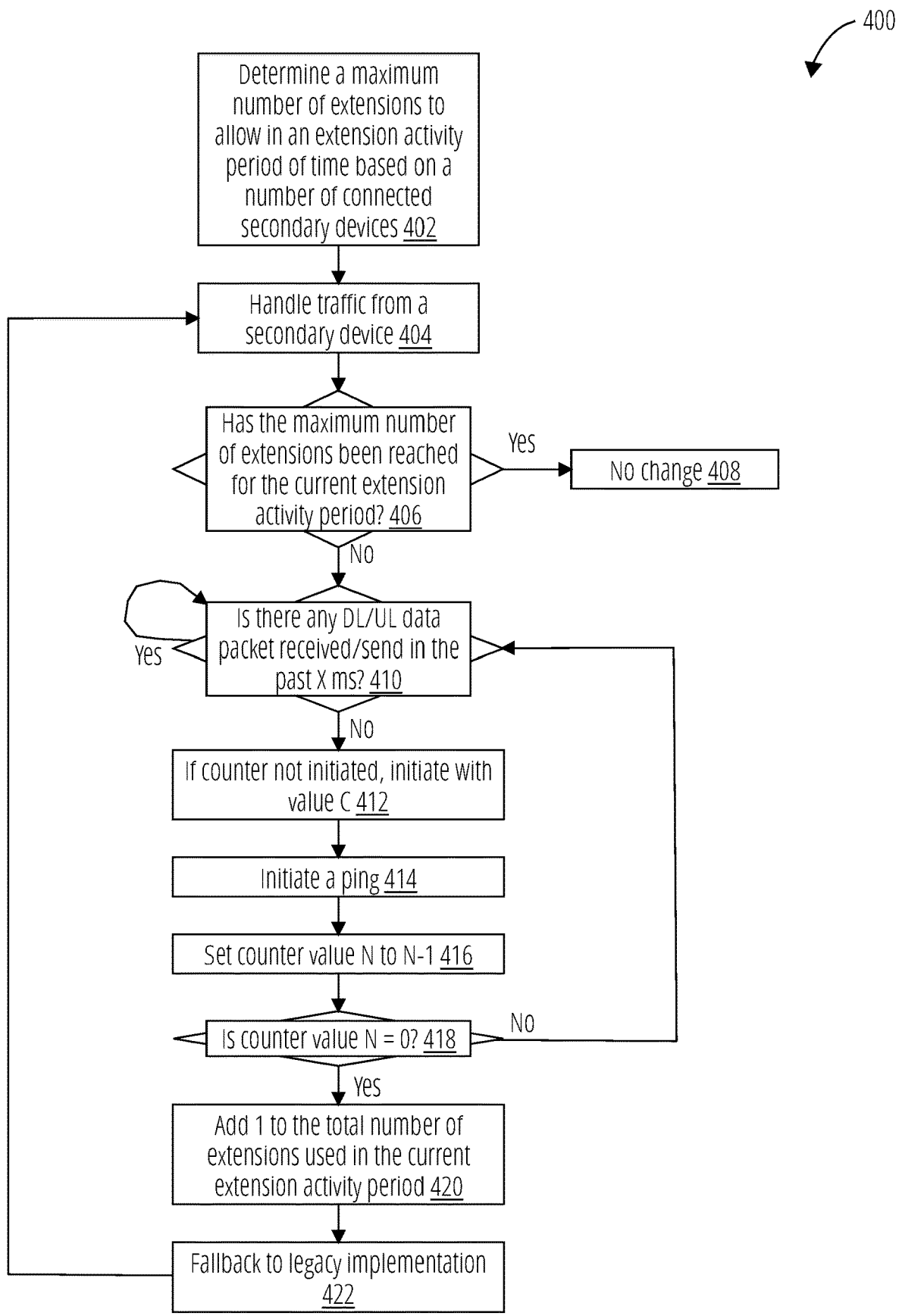
FIG. 4 illustrates a method of a UE for initiating signaling activity with a RAN node in order to remain in RRC Connected mode when connected to one or more secondary devices, according to an embodiment.

FIG. 4 illustrates a method 400 of a UE for initiating signaling activity with a RAN node in order to remain in RRC Connected mode when connected to one or more secondary devices, according to an embodiment. The UE using the method 400 may currently be in an RRC Connected mode and may be connected to (e.g., handling network traffic for) one or more secondary devices. The method 400 may correspond to a single period of time called an extension activity period, and may be repeated once the extension activity period has expired. This period may be set (e.g., predetermined) based on considerations of total power use by the method 400 and the UE's performance in handling the network traffic from the one or more connected secondary devices using the method 400.

The method 400 may begin at block 402, where the UE determines a maximum number of extensions (discussed below) to allow in the extension activity period based on a number of connected secondary devices. For example, if there is one connected secondary device, an X1 number of extensions may be allowed, and if there are two or more connected secondary devices, an X2 number of extensions may be allowed. In some embodiments, X2 may be greater than X1. These X1 and X2 parameters may be set (e.g., predetermined) based on considerations of total power use during the extension activity period and the UE's performance in handling the network traffic from the one or more connected secondary devices during the extension activity period. The method 400 then proceeds to block 404.

In block 404, the UE handles traffic from one or more of the connected secondary devices. The method then proceeds to decision block 406.

In decision block 406, the UE determines whether the maximum number of extensions has been reached for the current extension activity period. If so, the method 400 proceeds to the block 408. If not, the method 400 proceeds to the sub-method represented by the decision block 410 through the decision block 418.

The block 408 may represent no change, from, for example, a legacy implementation. Accordingly, an inactivity timer may be allowed to expire, and the UE may fall from (e.g., be placed in) the RRC Idle mode. From block 408, the method 400 may terminate (and may restart again upon the elapsing of the current extension activity period).

The elements of the method 400 from the decision block 410 through the decision block 418 may be analogous to the elements of the method 300 from the decision block 312 to the decision block 320. Accordingly, the elements of the method 400 from the decision block 410 through the decision block 418 may extend, via the use of signaling activity corresponding to a counter value, the amount time that the UE is in an RRC Connected mode after the handling of the traffic from the secondary device in the block 404, obtaining the benefits discussed above (e.g., if follow-up data occurs during this time, the UE is still in RRC Connected mode).

The elements of the method 400 from decision block 410 through the decision block 418 (including any repetitions thereof according to the illustrated loopback between the decision block 418 and the decision block 410) taken together may represent a single "extension" as discussed herein. In some embodiments, the elements from the decision block 410 through the decision block 418 may be replaced by a single instance of signaling (without the loopback and/or counter feature). In these cases, the single instance of signaling may represent a single "extension" as discussed herein. From the decision block 418, the method 400 proceeds to the block 420.

In the block 420, the UE adds 1 to the total number of extensions used in the current extension activity period. The method 400 then proceeds to the block 422.

In block 422, the UE falls back to a legacy implementation. This means that after the transition to block 422 as described above, the UE will no longer continue the signaling activity with the RAN node with the purpose of remaining in the RRC Connected mode (as in block 414), an inactivity timer may be allowed to expire (assuming that no other UL and/or DL data occurs on the channel between the UE and the RAN node), and the UE may fall from (e.g., be placed in) the RRC Idle mode. The method 400 then returns to the block 404.

The block 404 may again be performed when there is again traffic from a secondary device to handle at the UE, and the method 400 may continue either until the corresponding extension activity period elapses or until the block 408 is reached. Then, the method 400 may restart according to a new extension activity period.

Figure 5:
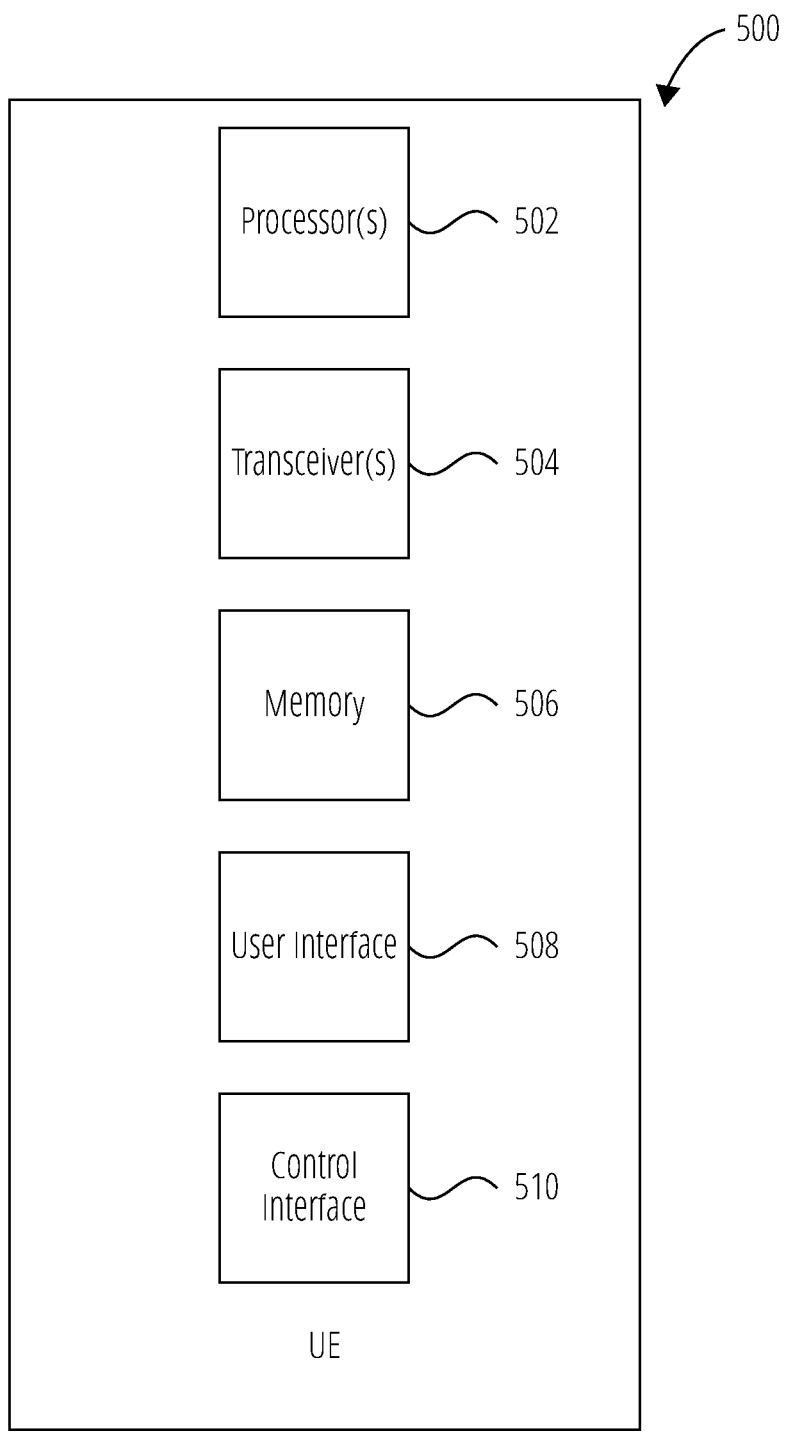
FIG. 5 illustrates a UE 500 in accordance with one embodiment.

FIG. 5 is a block diagram of an example UE 500 configurable according to various embodiments of the present disclosure, including by execution of instructions on a computer-readable medium that correspond to any of the example methods and/or procedures described herein. The UE 500 comprises one or more processor 502, transceiver 504, memory 506, user interface 508, and control interface 510.

The one or more processor 502 may include, for example, an application processor, an audio digital signal processor, a central processing unit, and/or one or more baseband processors. Each of the one or more processor 502 may include internal memory and/or may include interface(s) to communication with external memory (including the memory 506). The internal or external memory can store software code, programs, and/or instructions for execution by the one or more processor 502 to configure and/or facilitate the UE 500 to perform various operations, including operations described herein. For example, execution of the instructions can configure the UE 500 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 504, user interface 508, and/or control interface 510. As another example, the one or more processor 502 may execute program code stored in the memory 506 or other memory that corresponds to MAC, RLC, PDCP, and RRC layer protocols standardized by 3GPP (e.g., for NR and/or LTE). As a further example, the processor 502 may execute program code stored in the memory 506 or other memory that, together with the one or more transceiver 504, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 506 may comprise memory area for the one or more processor 502 to store variables used in protocols, configuration, control, and other functions of the UE 500, including operations corresponding to, or comprising, any of the example methods and/or procedures described herein. Moreover, the memory 506 may comprise non-volatile memory (e.g., flash memory), volatile memory (e.g., static or dynamic RAM), or a combination thereof. Furthermore, the memory 506 may interface with a memory slot by which removable memory cards in one or more formats (e.g., SD Card, Memory Stick, Compact Flash, etc.) can be inserted and removed.

The one or more transceiver 504 may include radio-frequency transmitter and/or receiver circuitry that facilitates the UE 500 to communicate with other equipment supporting like wireless communication standards and/or protocols. For example, the one or more transceiver 504 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 502. The RF circuitry may also include a transmit signal path which may include circuitry to upconvert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 504 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 502 to implement a PHY layer based on OFDM, OFDMA, and/or SC-FDMA technologies, such as described herein with respect to other figures.

The user interface 508 may take various forms depending on particular embodiments, or can be absent from the UE 500. In some embodiments, the user interface 508 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 500 may comprise a tablet computing device including a larger touchscreen display. In such embodiments, one or more of the mechanical features of the user interface 508 may be replaced by comparable or functionally equivalent virtual user interface features (e.g., virtual keypad, virtual buttons, etc.) implemented using the touchscreen display, as familiar to persons of ordinary skill in the art. In other embodiments, the UE 500 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 500 having a touch screen display are capable of receiving user inputs, such as inputs related to exemplary methods and/or procedures described herein or otherwise known to persons of ordinary skill in the art.

In some exemplary embodiments of the present disclosure, the UE 500 may include an orientation sensor, which can be used in various ways by features and functions of the UE 500. For example, the UE 500 can use outputs of the orientation sensor to determine when a user has changed the physical orientation of the UE 500's touch screen display. An indication signal from the orientation sensor can be available to any application program executing on the UE 500, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 510 may take various forms depending on particular embodiments. For example, the control interface 510 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 510 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 500 may include more functionality than is shown in FIG. 5 including, for example, a video and/or still-image camera, microphone, media player and/or recorder, etc. Moreover, the one or more transceiver 504 may include circuitry for communication using additional radio-frequency communication standards including Bluetooth, GPS, and/or others. Moreover, the one or more processor 502 may execute software code stored in the memory 506 to control such additional functionality. For example, directional velocity and/or position estimates output from a GPS receiver can be available to any application program executing on the UE 500, including various exemplary methods and/or computer-readable media according to various exemplary embodiments of the present disclosure.

Figure 6:
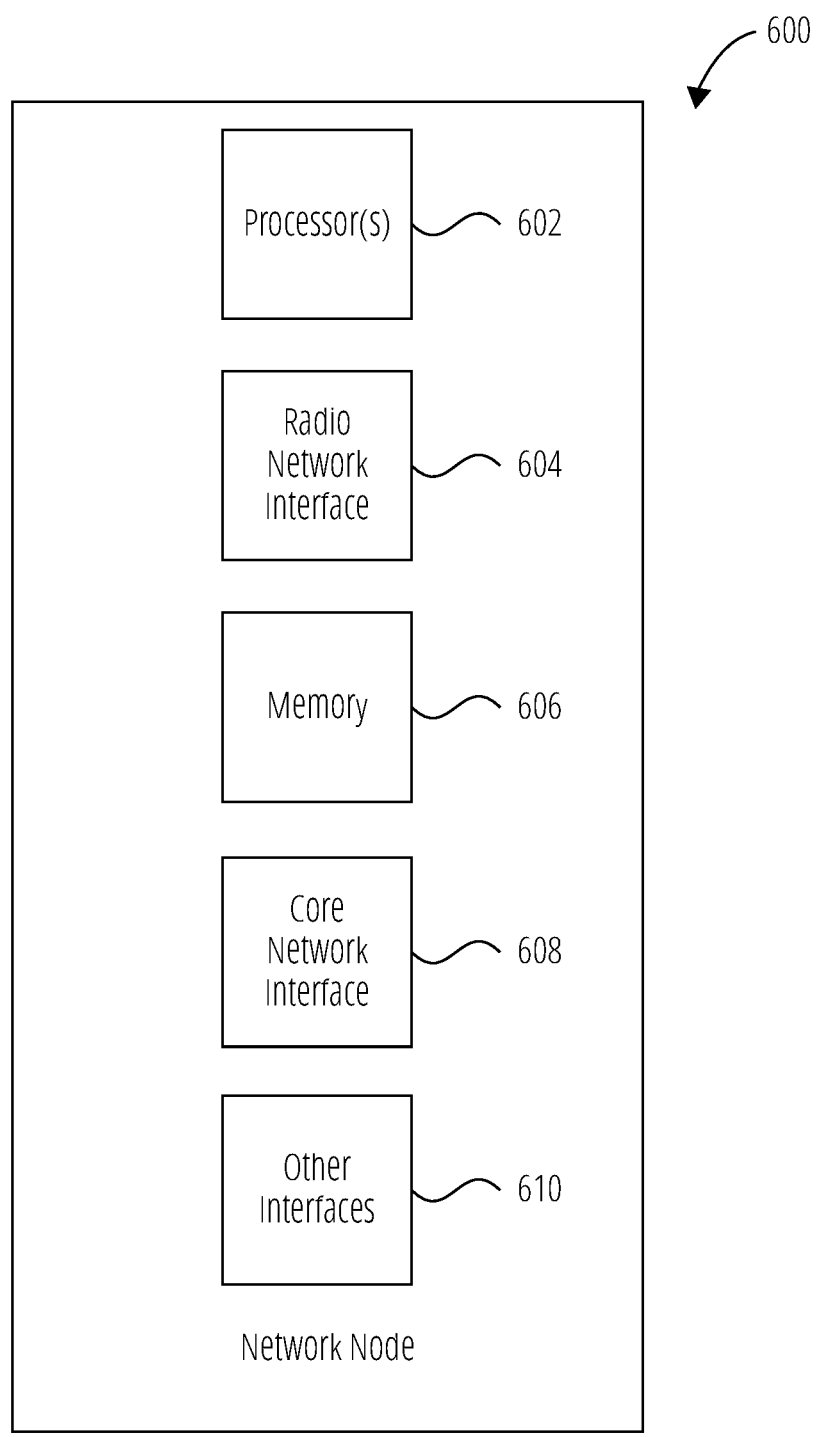
FIG. 6 illustrates a network node 600 in accordance with one embodiment.

FIG. 6 is a block diagram of an example network node 600 configurable according to various embodiments of the present disclosure, including by execution of instructions on a computer-readable medium that correspond to any of the example methods and/or procedures described herein.

The network node 600 includes a one or more processor 602, a radio network interface 604, a memory 606, a core network interface 608, and other interfaces 610. The network node 600 may comprise, for example, a base station, eNB, gNB, access node, or component thereof.

The one or more processor 602 may include any type of processor or processing circuitry and may be configured to perform any of the methods or procedures disclosed herein. The memory 606 may store software code, programs, and/or instructions executed by the one or more processor 602 to configure the network node 600 to perform various operations, including operations described herein. For example, execution of such stored instructions can configure the network node 600 to communicate with one or more other devices using protocols according to various embodiments of the present disclosure, including one or more methods and/or procedures discussed above. Furthermore, execution of such stored instructions can also configure and/or facilitate the network node 600 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 604 and the core network interface 608. By way of example and without limitation, the core network interface 608 comprises an S1 interface and the radio network interface 604 may comprise a Uu interface, as standardized by 3GPP. The memory 606 may also store variables used in protocols, configuration, control, and other functions of the network node 600. As such, the memory 606 may comprise non-volatile memory (e.g., flash memory, hard disk, etc.), volatile memory (e.g., static or dynamic RAM), network-based (e.g., "cloud") storage, or a combination thereof.

The radio network interface 604 may include transmitters, receivers, signal processors, ASICs, antennas, beamforming units, and other circuitry that enables network node 600 to communicate with other equipment such as, in some embodiments, a plurality of compatible user equipment (UE). In some embodiments, the network node 600 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 604 may include a PHY layer based on OFDM, OFDMA, and/or SC-FDMA technologies. In some embodiments, the functionality of such a PHY layer can be provided cooperatively by the radio network interface 604 and the one or more processor 602.

The core network interface 608 may include transmitters, receivers, and other circuitry that enables the network node 600 to communicate with other equipment in a core network such as, in some embodiments, circuit-switched (CS) and/or packet-switched Core (PS) networks. In some embodiments, the core network interface 608 may include the S1 interface standardized by 3GPP. In some embodiments, the core network interface 608 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 608 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 610 may include transmitters, receivers, and other circuitry that enables the network node 600 to communicate with external networks, computers, databases, and the like for purposes of operations, administration, and maintenance of the network node 600 or other network equipment operably connected thereto.

Figure 7:
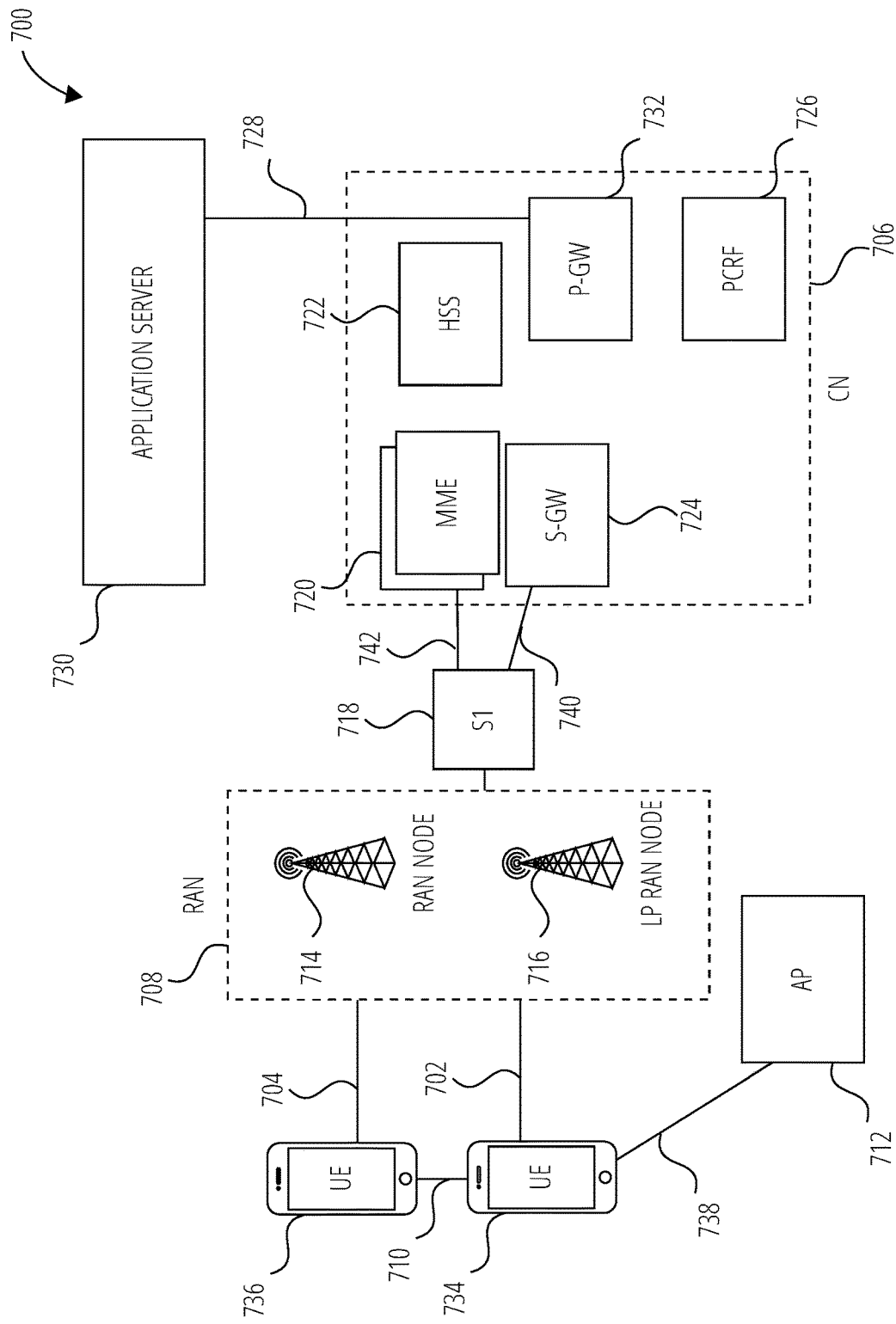
FIG. 7 illustrates a system 700 in accordance with one embodiment.

FIG. 7 illustrates an architecture of a system 700 of a network in accordance with some embodiments. The system 700 includes one or more user equipment (UE), shown in this example as a UE 736 and a UE 734. The UE 736 and the UE 734 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 736 and the UE 734 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 736 and the UE 734 may be configured to connect, e.g., communicatively couple, with a radio access network (RAN), shown as RAN 708. The RAN 708 may be, for example, an Evolved Universal Mobile Telecommunications System (UMTS) Terrestrial Radio Access Network (E-UTRAN), a NextGen RAN (NG RAN), or some other type of RAN. The UE 736 and the UE 734 utilize connection 704 and connection 702, respectively, each of which comprises a physical communications interface or layer (discussed in further detail below); in this example, the connection 704 and the connection 702 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 736 and the UE 734 may further directly exchange communication data via a ProSe interface 710. The ProSe interface 710 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 734 is shown to be configured to access an access point (AP), shown as AP 712, via connection 738. The connection 738 can comprise a local wireless connection, such as a connection consistent with any IEEE 802.11 protocol, wherein the AP 712 would comprise a wireless fidelity (WiFi®) router. In this example, the AP 712 may be connected to the Internet without connecting to the core network of the wireless system (described in further detail below).

The RAN 708 can include one or more access nodes that enable the connection 704 and the connection 702. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 708 may include one or more RAN nodes for providing macrocells, e.g., macro RAN node 714, and one or more RAN nodes for providing femtocells or picocells (e.g., cells having smaller coverage areas, smaller user capacity, or higher bandwidth compared to macrocells), e.g., a low power (LP) RAN node such as LP RAN node 716.

Any of the macro RAN node 714 and the LP RAN node 716 can terminate the air interface protocol and can be the first point of contact for the UE 736 and the UE 734. In some embodiments, any of the macro RAN node 714 and the LP RAN node 716 can fulfill various logical functions for the RAN 708 including, but not limited to, radio network controller (RNC) functions such as radio bearer management, uplink and downlink dynamic radio resource management and data packet scheduling, and mobility management.

In accordance with some embodiments, the UE 736 and the UE 734 can be configured to communicate using Orthogonal Frequency-Division Multiplexing (OFDM) communication signals with each other or with any of the macro RAN node 714 and the LP RAN node 716 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 714 and the LP RAN node 716 to the UE 736 and the UE 734, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 736 and the UE 734. The physical downlink control channel (PDCCH) may carry information about the transport format and resource allocations related to the PDSCH channel, among other things. It may also inform the UE 736 and the UE 734 about the transport format, resource allocation, and H-ARQ (Hybrid Automatic Repeat Request) information related to the uplink shared channel. Typically, downlink scheduling (assigning control and shared channel resource blocks to the UE 734 within a cell) may be performed at any of the macro RAN node 714 and the LP RAN node 716 based on channel quality information fed back from any of the UE 736 and UE 734. The downlink resource assignment information may be sent on the PDCCH used for (e.g., assigned to) each of the UE 736 and the UE 734.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 708 is communicatively coupled to a core network (CN), shown as CN 706—via an S1 interface 718. In embodiments, the CN 706 may be an evolved packet core (EPC) network, a NextGen Packet Core (NPC) network, or some other type of CN. In this embodiment the S1 interface 718 is split into two parts: the S1-U interface 740, which carries traffic data between the macro RAN node 714 and the LP RAN node 716 and a serving gateway (S-GW), shown as S-GW 724, and an S1-mobility management entity (MME) interface, shown as S1-MME interface 742, which is a signaling interface between the macro RAN node 714 and LP RAN node 716 and the MME(s) 720.

In this embodiment, the CN 706 comprises the MME(s) 720, the S-GW 724, a Packet Data Network (PDN) Gateway (P-GW) (shown as P-GW 732), and a home subscriber server (HSS) (shown as HSS 722). The MME(s) 720 may be similar in function to the control plane of legacy Serving General Packet Radio Service (GPRS) Support Nodes (SGSN). The MME(s) 720 may manage mobility aspects in access such as gateway selection and tracking area list management. The HSS 722 may comprise a database for network users, including subscription-related information to support the network entities' handling of communication sessions. The CN 706 may comprise one or several HSS 722, depending on the number of mobile subscribers, on the capacity of the equipment, on the organization of the network, etc. For example, the HSS 722 can provide support for routing/roaming, authentication, authorization, naming/addressing resolution, location dependencies, etc.

The S-GW 724 may terminate the S1 interface 718 towards the RAN 708, and routes data packets between the RAN 708 and the CN 706. In addition, the S-GW 724 may be a local mobility anchor point for inter-RAN node handovers and also may provide an anchor for inter-3GPP mobility. Other responsibilities may include lawful intercept, charging, and some policy enforcement.

The P-GW 732 may terminate an SGi interface toward a PDN. The P-GW 732 may route data packets between the CN 706 (e.g., an EPC network) and external networks such as a network including the application server 730 (alternatively referred to as application function (AF)) via an Internet Protocol (IP) interface (shown as IP communications interface 728). Generally, an application server 730 may be an element offering applications that use IP bearer resources with the core network (e.g., UMTS Packet Services (PS) domain, LTE PS data services, etc.). In this embodiment, the P-GW 732 is shown to be communicatively coupled to an application server 730 via an IP communications interface 728. The application server 730 can also be configured to support one or more communication services (e.g., Voice-over-Internet Protocol (VoIP) sessions, PTT sessions, group communication sessions, social networking services, etc.) for the UE 736 and the UE 734 via the CN 706.

The P-GW 732 may further be a node for policy enforcement and charging data collection. A Policy and Charging Enforcement Function (PCRF) (shown as PCRF 726) is the policy and charging control element of the CN 706. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 732. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 8:
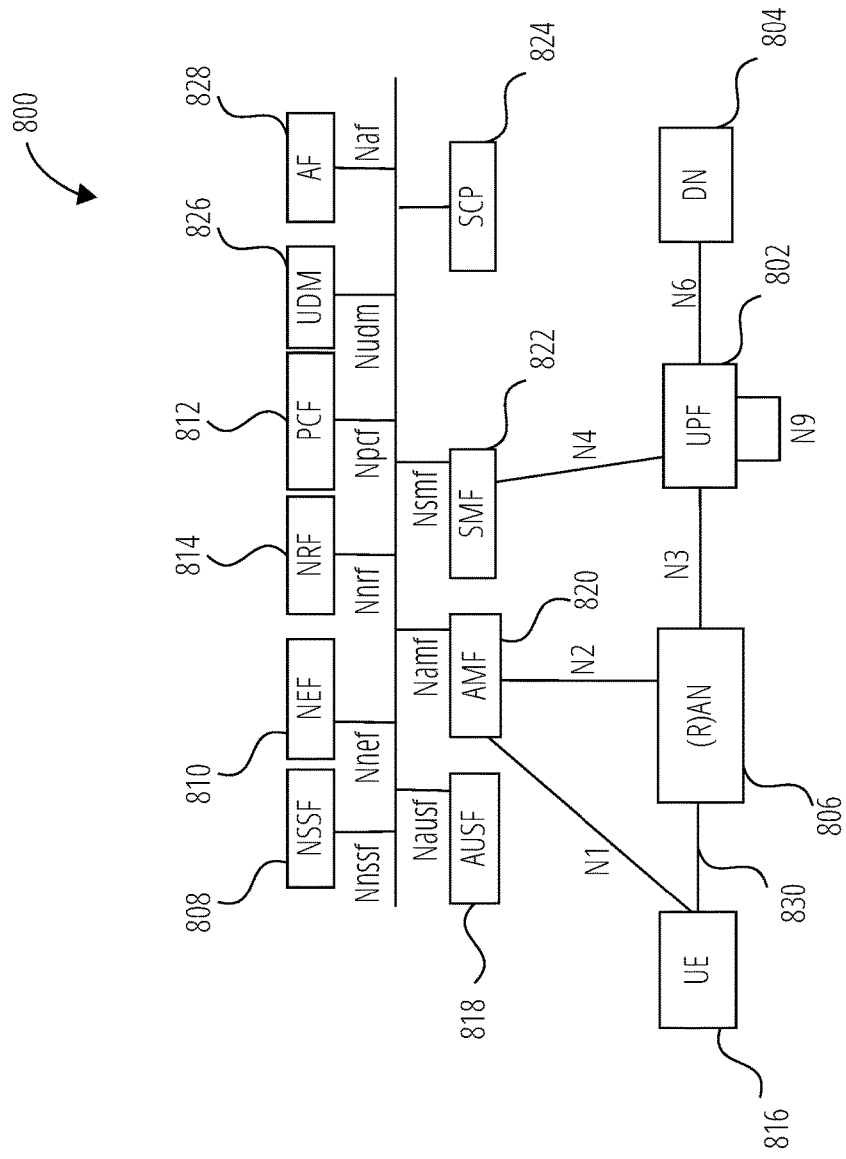
FIG. 8 illustrates an example service based architecture 800 in accordance with certain embodiments.

FIG. 8 illustrates a service based architecture 800 in 5GS according to one embodiment. As described in 3GPP TS 23.501, the service based architecture 800 comprises NFs such as an NSSF 808, a NEF 810, an NRF 814, a PCF 812, a UDM 826, an AUSF 818, an AMF 820, an SMF 822, for communication with a UE 816, a (R)AN 806, a UPF 802, and a DN 804. The NFs and NF services can communicate directly, referred to as Direct Communication, or indirectly via a SCP 824, referred to as Indirect Communication. FIG. 8 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 8 are described below.

The NSSF 808 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 810 supports exposure of capabilities and events. NF capabilities and events may be securely exposed by the NEF 810 (e.g., for 3rd party, Application Functions, and/or Edge Computing). The NEF 810 may store/retrieve information as structured data using a standardized interface (Nudr) to a UDR. The NEF 810 may also secure provision of information from an external application to 3GPP network and may provide for the Application Functions to securely provide information to the 3GPP network (e.g., expected UE behavior, 5GLAN group information, and service specific information), wherein the NEF 810 may authenticate and authorize and assist in throttling the Application Functions. The NEF 810 may provide translation of internal-external information by translating between information exchanged with the AF and information exchanged with the internal network function. For example, the NEF 810 translates between an AF-Service-Identifier and internal 5G Core information such as DNN and S-NSSAI. The NEF 810 may handle masking of network and user sensitive information to external AF's according to the network policy. The NEF 810 may receive information from other network functions (based on exposed capabilities of other network functions), and stores the received information as structured data using a standardized interface to a UDR. The stored information can be accessed and re-exposed by the NEF 810 to other network functions and Application Functions, and used for other purposes such as analytics. For external exposure of services related to specific UE(s), the NEF 810 may reside in the HPLMN. Depending on operator agreements, the NEF 810 in the HPLMN may have interface(s) with NF(s) in the VPLMN. When a UE is capable of switching between EPC and 5GC, an SCEF+NEF may be used for service exposure.

The NRF 814 supports service discovery function by receiving an NF Discovery Request from an NF instance or SCP and providing the information of the discovered NF instances to the NF instance or SCP. The NRF 814 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 812 supports a unified policy framework to govern network behavior. The PCF 812 provides policy rules to Control Plane function(s) to enforce them. The PCF 812 accesses subscription information relevant for policy decisions in a Unified Data Repository (UDR). The PCF 812 may access the UDR located in the same PLMN as the PCF.

The UDM 826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 826 uses subscription data (including authentication data) that may be stored in a UDR, in which case a UDM implements the application logic and may not require an internal user data storage and several different UDMs may serve the same user in different transactions. The UDM 826 may be located in the HPLMN of the subscribers it serves, and may access the information of the UDR located in the same PLMN.

The AF 828 interacts with the Core Network to provide services that, for example, support the following: application influence on traffic routing; accessing the NEF 810; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 810 to interact with relevant Network Functions.

The AUSF 818 supports authentication for 3GPP access and untrusted non-3GPP access. The AUSF 818 may also provide support for Network Slice-Specific Authentication and Authorization.

The AMF 820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 820. Regardless of the number of Network functions, in certain embodiments there is only one NAS interface instance per access network between the UE and the CN, terminated at one of the Network functions that implements at least NAS security and Mobility Management. The AMF 820 may also include policy related functionalities.

In addition to the functionalities described above, the AMF 820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 822 may include policy related functionalities.

The SCP 824 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 816 may include a device with radio communication capabilities. For example, the UE 816 may comprise a smartphone (e.g., handheld touchscreen mobile computing devices connectable to one or more cellular networks). The UE 816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 816 may be configured to connect or communicatively couple with the (R)AN 806 through a radio interface 830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 816 and the (R)AN 806 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 806 to the UE 816 and a UL transmission may be from the UE 816 to the (R)AN 806. The UE 816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 806 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 802 may act as an anchor point for intra-RAT and inter-RAT mobility, an external PDU session point of interconnect to the DN 804, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 802 may include an uplink classifier to support routing traffic flows to a data network. The DN 804 may represent various network operator services, Internet access, or third party services. The DN 804 may include, for example, an application server.

Figure 9:
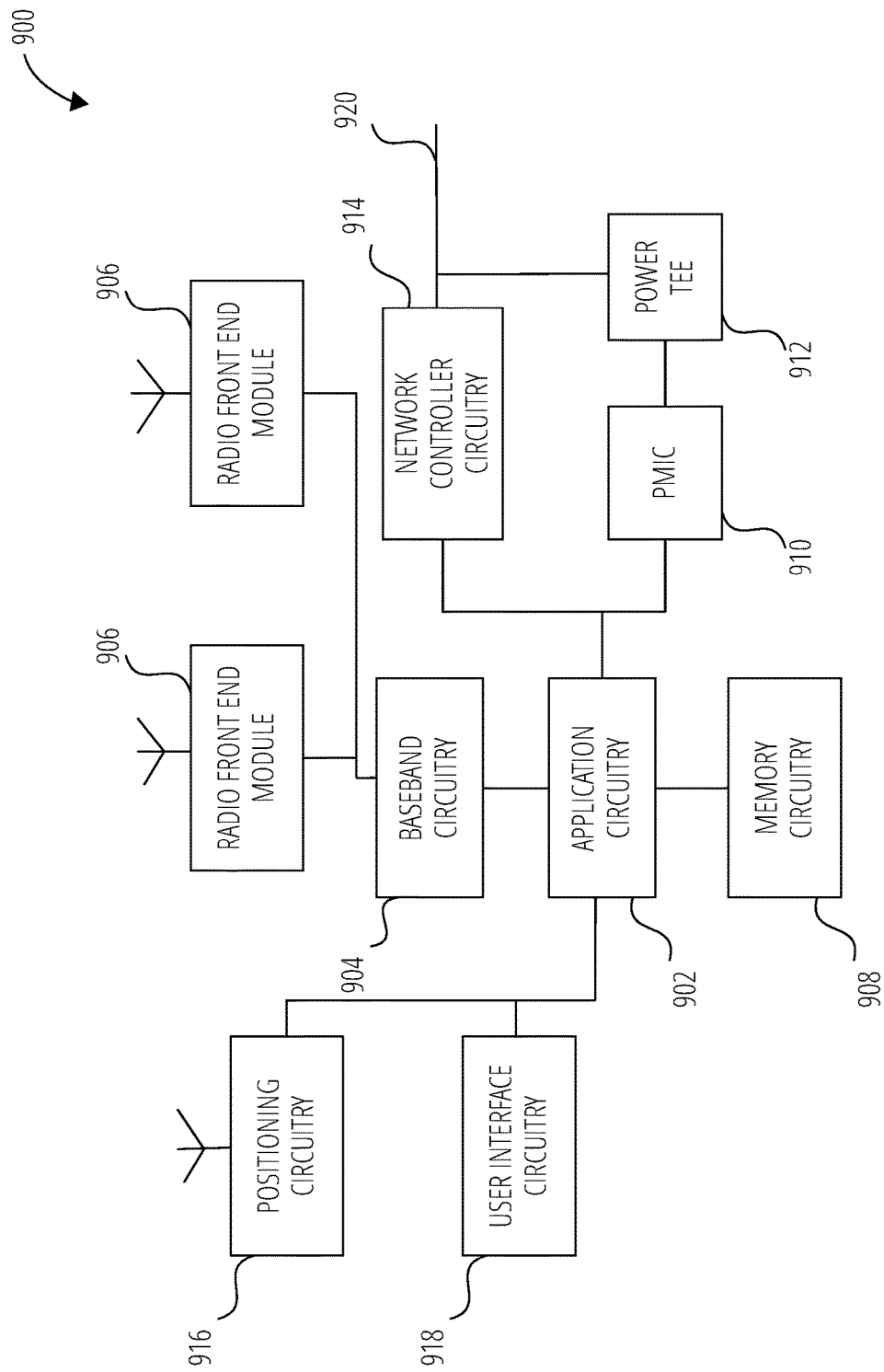
FIG. 9 illustrates an infrastructure equipment 900 in accordance with one embodiment.

FIG. 9 illustrates an example of infrastructure equipment 900 in accordance with various embodiments. The infrastructure equipment 900 may be implemented as a base station, radio head, RAN node, AN, application server, and/or any other element/device discussed herein. In other examples, the infrastructure equipment 900 could be implemented in or by a UE.

The infrastructure equipment 900 includes application circuitry 902, baseband circuitry 904, one or more radio front end module 906 (RFEM), memory circuitry 908, power management integrated circuitry (shown as PMIC 910), power tee circuitry 912, network controller circuitry 914, network interface connector 920, satellite positioning circuitry 916, and user interface circuitry 918. In some embodiments, the device infrastructure equipment 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 902 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 902 may be coupled with or may include memory/storage elements and may be configured to execute instructions stored in the memory/storage to enable various applications or operating systems to run on the infrastructure equipment 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 902 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 902 may comprise, or may be, a special-purpose processor/controller to operate according to the various embodiments herein. As examples, the processor(s) of application circuitry 902 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 900 may not utilize application circuitry 902, and instead may include a special-purpose processor/controller to process IP data received from an EPC or 5GC, for example.

In some implementations, the application circuitry 902 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 902 may comprise logic blocks or logic fabric, and other interconnected resources that may be programmed to perform various functions, such as the procedures, methods, functions, etc. of the various embodiments discussed herein. In such embodiments, the circuitry of application circuitry 902 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 904 may be implemented, for example, as a solder-down substrate including one or more integrated circuits, a single packaged integrated circuit soldered to a main circuit board or a multi-chip module containing two or more integrated circuits.

The user interface circuitry 918 may include one or more user interfaces designed to enable user interaction with the infrastructure equipment 900 or peripheral component interfaces designed to enable peripheral component interaction with the infrastructure equipment 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 906 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 906, which incorporates both mmWave antennas and sub-mmWave.

The memory circuitry 908 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 908 may be implemented as one or more of solder down packaged integrated circuits, socketed memory modules and plug-in memory cards.

The PMIC 910 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 912 may provide for electrical power drawn from a network cable to provide both power supply and data connectivity to the infrastructure equipment 900 using a single cable.

The network controller circuitry 914 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 920 using a physical connection, which may be electrical (commonly referred to as a "copper interconnect"), optical, or wireless. The network controller circuitry 914 may include one or more dedicated processors and/or FPGAs to communicate using one or more of the aforementioned protocols. In some implementations, the network controller circuitry 914 may include multiple controllers to provide connectivity to other networks using the same or different protocols.

The positioning circuitry 916 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 916 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 916 may include a Micro-Technology for Positioning, Navigation, and Timing (Micro-PNT) IC that uses a master timing clock to perform position tracking/estimation without GNSS assistance. The positioning circuitry 916 may also be part of, or interact with, the baseband circuitry 904 and/or radio front end module 906 to communicate with the nodes and components of the positioning network. The positioning circuitry 916 may also provide position data and/or time data to the application circuitry 902, which may use the data to synchronize operations with various infrastructure, or the like. The components shown by FIG. 9 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 10:
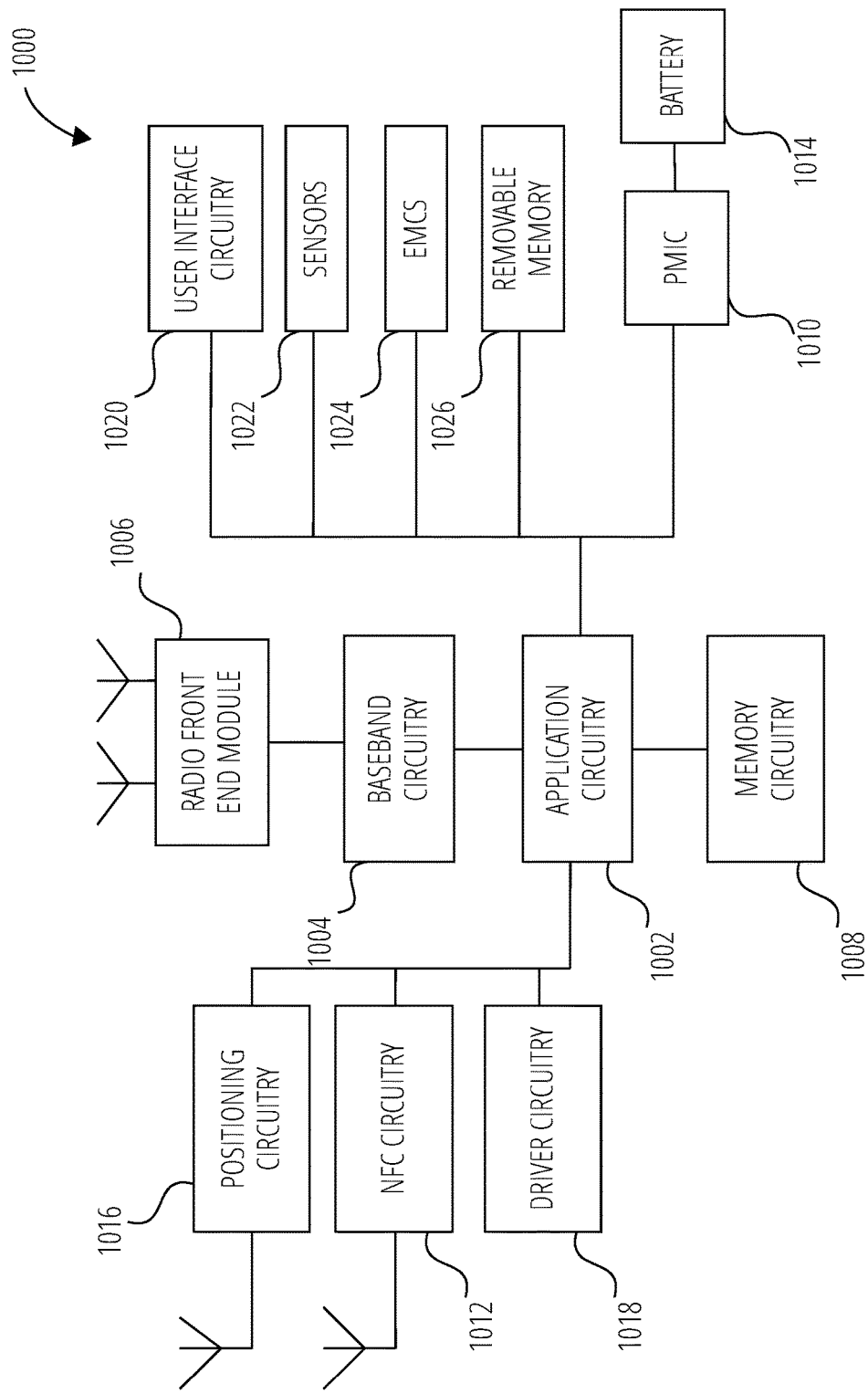
FIG. 10 illustrates a platform 1000 in accordance with one embodiment.

FIG. 10 illustrates an example of a platform 1000 in accordance with various embodiments. In embodiments, the computer platform 1000 may be suitable for use as UEs, application servers, and/or any other element/device discussed herein. The platform 1000 may include any combinations of the components shown in the example. The components of platform 1000 may be implemented as integrated circuits (ICs), portions thereof, discrete electronic devices, or other modules, logic, hardware, software, firmware, or a combination thereof adapted in the computer platform 1000, or as components otherwise incorporated within a chassis of a larger system. The block diagram of FIG. 10 is intended to show a high level view of components of the computer platform 1000. However, some of the components shown may be omitted, additional components may be present, and different arrangement of the components shown may occur in other implementations.

Application circuitry 1002 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1002 may be coupled with or may include memory/storage elements and may be configured to execute instructions stored in the memory/storage to enable various applications or operating systems to run on the platform 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1002 may comprise, or may be, a special-purpose processor/controller to operate according to the various embodiments herein.

As examples, the processor(s) of application circuitry 1002 may include an Intel® Architecture Core™ based processor, such as a Quark™, an Atom™, an i3, an i5, an i7, or an MCU-class processor, or another such processor available from Intel® Corporation. The processors of the application circuitry 1002 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1002 may be a part of a system on a chip (SoC) in which the application circuitry 1002 and other components are formed into a single integrated circuit, or a single package, such as the Edison™ or Galileo™ SoC boards from Intel® Corporation.

Additionally or alternatively, application circuitry 1002 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1004 may be implemented, for example, as a solder-down substrate including one or more integrated circuits, a single packaged integrated circuit soldered to a main circuit board or a multi-chip module containing two or more integrated circuits.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include any number and type of memory devices used to provide for a given amount of system memory. As examples, the memory circuitry 1008 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1008 may be developed in accordance with a Joint Electron Devices Engineering Council (JEDEC) low power double data rate (LPDDR)-based design, such as LPDDR2, LPDDR3, LPDDR4, or the like. Memory circuitry 1008 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1008 maybe on-die memory or registers associated with the application circuitry 1002. To provide for persistent storage of information such as data, applications, operating systems and so forth, memory circuitry 1008 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1000 may incorporate the three-dimensional (3D) cross-point (XPOINT) memories from Intel® and Micron®.

The removable memory 1026 may include devices, circuitry, enclosures/housings, ports or receptacles, etc. used to couple portable data storage devices with the platform 1000. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1000 may also include interface circuitry (not shown) that is used to connect external devices with the platform 1000. The external devices connected to the platform 1000 via the interface circuitry include sensors 1022 and electro-mechanical components (shown as EMCs 1024), as well as removable memory devices coupled to removable memory 1026.

The sensors 1022 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1024 include devices, modules, or subsystems whose purpose is to enable platform 1000 to change its state, position, and/or orientation, or move or control a mechanism or (sub) system. Additionally, EMCs 1024 may be configured to generate and send messages/signaling to other components of the platform 1000 to indicate a current state of the EMCs 1024. Examples of the EMCs 1024 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1000 is configured to operate one or more EMCs 1024 based on one or more captured events and/or instructions or control signals received from a service provider and/or various clients. In some implementations, the interface circuitry may connect the platform 1000 with positioning circuitry 1016. The positioning circuitry 1016 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-PNT IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure (e.g., radio base stations), for turn-by-turn navigation applications, or the like.

In some implementations, the interface circuitry may connect the platform 1000 with Near-Field Communication circuitry (shown as NFC circuitry 1012). The NFC circuitry 1012 is configured to provide contactless, short-range communications based on radio frequency identification (RFID) standards, wherein magnetic field induction is used to enable communication between NFC circuitry 1012 and NFC-enabled devices external to the platform 1000 (e.g., an "NFC touchpoint"). NFC circuitry 1012 comprises an NFC controller coupled with an antenna element and a processor coupled with the NFC controller. The NFC controller may be a chip/IC providing NFC functionalities to the NFC circuitry 1012 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1012, or initiate data transfer between the NFC circuitry 1012 and another active NFC device (e.g., a smartphone or an NFC-enabled POS terminal) that is proximate to the platform 1000.

The driver circuitry 1018 may include software and hardware elements that operate to control particular devices that are embedded in the platform 1000, attached to the platform 1000, or otherwise communicatively coupled with the platform 1000. The driver circuitry 1018 may include individual drivers allowing other components of the platform 1000 to interact with or control various input/output (I/O) devices that may be present within, or connected to, the platform 1000. For example, driver circuitry 1018 may include a display driver to control and allow access to a display device, a touchscreen driver to control and allow access to a touchscreen interface of the platform 1000, sensor drivers to obtain sensor readings of sensors 1022 and control and allow access to sensors 1022, EMC drivers to obtain actuator positions of the EMCs 1024 and/or control and allow access to the EMCs 1024, a camera driver to control and allow access to an embedded image capture device, audio drivers to control and allow access to one or more audio devices.

The power management integrated circuitry (shown as PMIC 1010) (also referred to as "power management circuitry") may manage power provided to various components of the platform 1000. In particular, with respect to the baseband circuitry 1004, the PMIC 1010 may control power-source selection, voltage scaling, battery charging, or DC-to-DC conversion. The PMIC 1010 may often be included when the platform 1000 is capable of being powered by a battery 1014, for example, when the device is included in a UE.

In some embodiments, the PMIC 1010 may control, or otherwise be part of, various power saving mechanisms of the platform 1000. For example, if the platform 1000 is in an RRC_Connected state, where it is still connected to the RAN node as it expects to receive traffic shortly, then it may enter a state known as Discontinuous Reception Mode (DRX) after a period of inactivity. During this state, the platform 1000 may power down for brief intervals of time and thus save power. If there is no data traffic activity for an extended period of time, then the platform 1000 may transition off to an RRC_Idle state, where it disconnects from the network and does not perform operations such as channel quality feedback, handover, etc. The platform 1000 goes into a very low power state and it performs paging where again it periodically wakes up to listen to the network and then powers down again. The platform 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1014 may power the platform 1000, although in some examples the platform 1000 may be mounted deployed in a fixed location, and may have a power supply coupled to an electrical grid. The battery 1014 may be a lithium ion battery, a metal-air battery, such as a zinc-air battery, an aluminum-air battery, a lithium-air battery, and the like. In some implementations, such as in V2X applications, the battery 1014 may be a typical lead-acid automotive battery.

In some implementations, the battery 1014 may be a "smart battery," which includes or is coupled with a Battery Management System (BMS) or battery monitoring integrated circuitry. The BMS may be included in the platform 1000 to track the state of charge (SoCh) of the battery 1014. The BMS may be used to monitor other parameters of the battery 1014 to provide failure predictions, such as the state of health (SoH) and the state of function (SoF) of the battery 1014. The BMS may communicate the information of the battery 1014 to the application circuitry 1002 or other components of the platform 1000. The BMS may also include an analog-to-digital (ADC) convertor that allows the application circuitry 1002 to directly monitor the voltage of the battery 1014 or the current flow from the battery 1014. The battery parameters may be used to determine actions that the platform 1000 may perform, such as transmission frequency, network operation, sensing frequency, and the like.

A power block, or other power supply coupled to an electrical grid may be coupled with the BMS to charge the battery 1014. In some examples, the power block may be replaced with a wireless power receiver to obtain the power wirelessly, for example, through a loop antenna in the computer platform 1000. In these examples, a wireless battery charging circuit may be included in the BMS. The specific charging circuits chosen may depend on the size of the battery 1014, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1020 includes various input/output (I/O) devices present within, or connected to, the platform 1000, and includes one or more user interfaces designed to enable user interaction with the platform 1000 and/or peripheral component interfaces designed to enable peripheral component interaction with the platform 1000. The user interface circuitry 1020 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1000. The output device circuitry may also include speakers or other audio emitting devices, printer(s), and/or the like. In some embodiments, the sensors 1022 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1000 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 11:
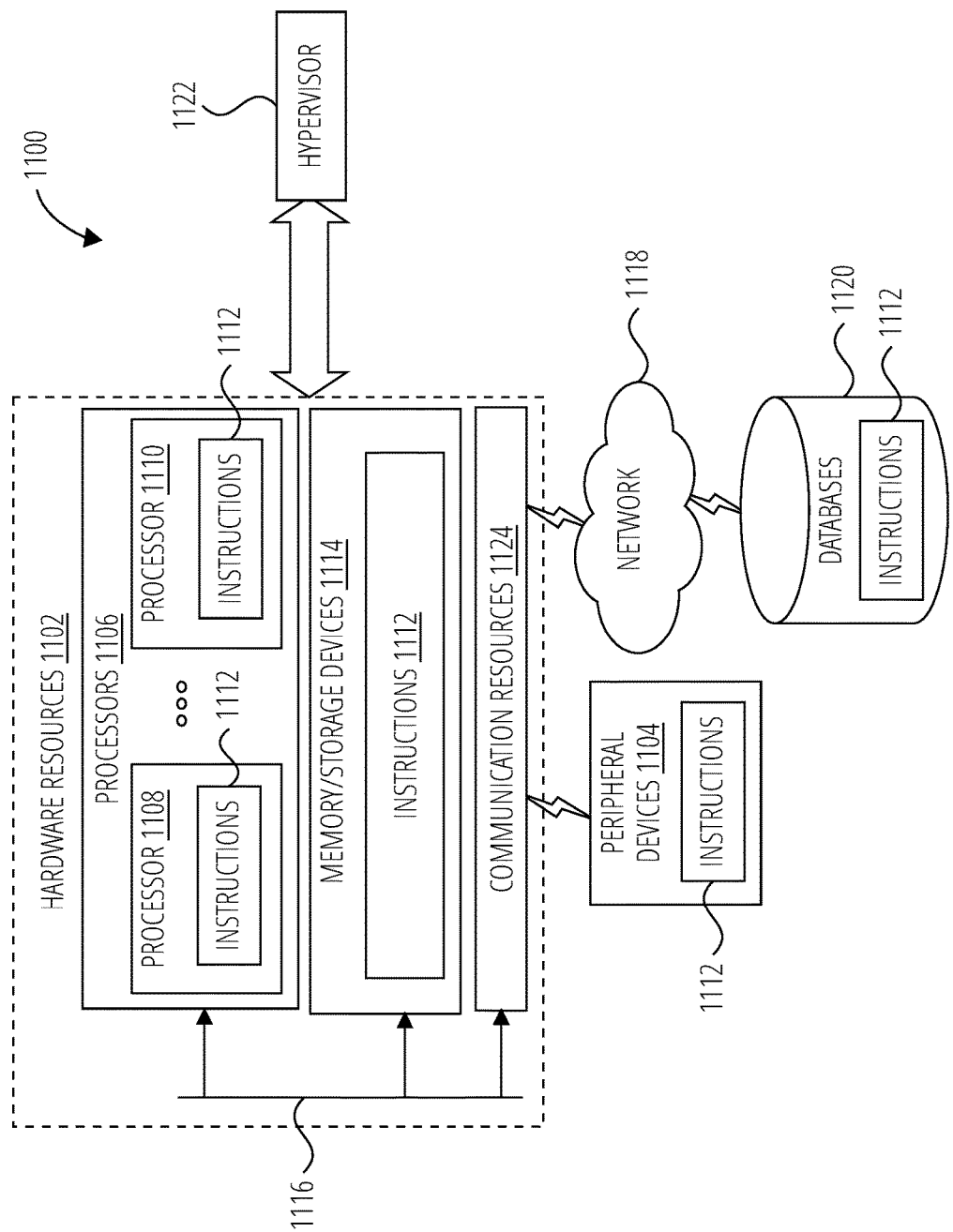
FIG. 11 illustrates components 1100 in accordance with one embodiment.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a user equipment (UE) to extend connectivity with a cellular network, the method comprising: monitoring at least one of a serving cell of the UE and a neighbor cell of the UE to determine whether there is a network condition wherein the UE is to transition to an out-of-service (OOS) state; and in response to determining the network condition, before expiration of an inactivity period, initiating signaling activity with a radio access network (RAN) node of the serving cell.

Example 2 is the method of Example 1, wherein monitoring the serving cell comprises comparing a reference signal received power (RSRP) measurement of the serving cell to a serving cell RSRP threshold value.

Example 3 is the method of Example 2, wherein the serving cell RSRP threshold value is based on a minimum specified RSRP measurement of the serving cell as set by the RAN node of the serving cell.

Example 4 is the method of Example 3, wherein the serving cell RSRP threshold value is further based on a serving cell RSRP threshold buffer amount that raises the serving cell RSRP threshold value.

Example 5 is the method of any of Examples 1-4, wherein monitoring the neighbor cell comprises comparing a reference signal received power (RSRP) measurement of the neighbor cell to a neighbor cell RSRP threshold value.

Example 6 is the method of Example 5, wherein the neighbor cell RSRP threshold value is based on an RSRP measurement of the serving cell.

Example 7 is the method of Example 6, wherein the neighbor cell RSRP threshold value is further based on a neighbor cell RSRP threshold buffer amount that raises the neighbor cell RSRP threshold value.

Example 8 is the method of any of Examples 1-7, further comprising making a battery level measurement of a battery of the UE; and wherein initiating signaling activity with the RAN node of the serving cell is further in response to a determination that the battery level measurement is above a battery level threshold.

Example 9 is the method of any of Examples 1-8, wherein initiating signaling activity with the RAN node of the serving cell is further in response to a determination that no user data of signaling packet has been sent between the UE and the RAN node during a pre-determined period that is less than the inactivity period.

Example 10 is the method of any of Examples 1-9, further comprising modifying a value of a counter corresponding to the signaling activity with the RAN node of the serving cell, and wherein at least a portion of the signaling activity with the RAN node of the serving cell occurs further in response to a determination that the value of the counter has not reached a final value.

Example 11 is a computing apparatus of a user equipment (UE), the computing apparatus comprising a processor; and a memory storing instructions that, when executed by the processor, configure the apparatus to: monitor at least one of a serving cell of the UE and a neighbor cell of the UE to determine whether there is a network condition wherein the UE is to transition to an out-of-service (OOS) state; and in response to determining the network condition, before expiration of an inactivity period, generate uplink data for the UE to send to a radio access network (RAN) node of the serving cell.

Example 12 is the computing apparatus of Example 11, wherein monitoring the serving cell comprises comparing a reference signal received power (RSRP) measurement of the serving cell to a serving cell RSRP threshold value.

Example 13 is the computing apparatus of Example 12, wherein the serving cell RSRP threshold value is based on a minimum specified RSRP measurement of the serving cell as set by the RAN node of the serving cell.

Example 14 is the computing apparatus of Example 13, wherein the serving cell RSRP threshold value is further based on a serving cell RSRP threshold buffer amount that raises the serving cell RSRP threshold value.

Example 15 is the computing apparatus of any of Examples 11-14, the memory further storing instructions that, when executed by the processor, further configure the apparatus to: make a battery level measurement of a battery of the UE; and generate the message for the UE to send to the RAN node of the serving cell further in response to a determination that the battery level measurement is above a battery level threshold.

Example 16 is a non-transitory computer-readable storage medium, the computer-readable storage medium including instructions that when executed by a processor of a user equipment (UE), cause the processor to: monitor at least one of a serving cell of the UE and a neighbor cell of the UE to determine whether there is a network condition wherein the UE is to transition to an out-of-service (OOS) state; and in response to determining the network condition, before expiration of an inactivity period, generate uplink data for the UE to send to a radio access network (RAN) node of the serving cell.

Example 17 is the non-transitory computer-readable storage medium of Example 16, wherein monitoring the neighbor cell comprises comparing a reference signal received power (RSRP) measurement of the neighbor cell to a neighbor cell RSRP threshold value.

Example 18 is the non-transitory computer-readable storage medium of Example 17, wherein the neighbor cell RSRP threshold value is based on an RSRP measurement of the serving cell.

Example 19 is the non-transitory computer-readable storage medium of Example 18, wherein the neighbor cell RSRP threshold value is further based on a neighbor cell RSRP threshold buffer amount that raises the neighbor cell RSRP threshold value.

Example 20 is the non-transitory computer-readable storage medium of any of Examples 16-19, wherein the instructions further cause the processor to generate the uplink data for the UE to send to the RAN node of the serving cell in response to a determination that no user data or signaling packet has been sent between the UE and the RAN node during a pre-determined period that is less than the inactivity period.

Example 21 is the non-transitory computer-readable storage medium of any of Examples 16-20, wherein the instructions further cause the processor to: generate at least a portion of the uplink data for the UE to send to the RAN node in response to a determination that a value of the counter has not reached a final value; and modify the value of the counter corresponding to the generation of the portion of the uplink data for the UE to send to the RAN node of the serving cell.

Example 22 is a method for a user equipment (UE) to extend connectivity with a cellular network, the method comprising: determining a maximum number of extensions to allow in an extension activity period based on a number of secondary devices connected to the UE; and during the extension activity period, in response to detecting traffic from a secondary device and in response to determining that the total number of extensions has not been reached during the extension activity period, before expiration of an inactivity period, initiating signaling activity with a radio access network (RAN) node of the serving cell.

Example 23 is the method of Example 22, wherein the signaling activity with of the RAN node of the serving cell is according to an extension comprising a plurality of pings.

Example 24 is the method of any of Examples 22-23, wherein the initiating signaling activity with the RAN node of the serving cell is further in response to a determination that no user data or signaling packet has been sent between the UE and the RAN node during a pre-determined period that is less than the inactivity period.

Example 25 is the method of any of Examples 22-24, further comprising modifying a value of a counter corresponding to the signaling activity with the RAN node of the serving cell, and wherein at least a portion of the signaling activity with the RAN node of the serving cell occurs further in response to a determination that the value of the counter has not reached a final value.

Example 26 is the method of any of Examples 22-25, wherein the maximum number of extensions to allow in the extension activity period is determined to be a first value when a single secondary device is connected to the UE, and wherein the maximum number of extensions to allow in the extension activity period is determined to be a second value when a plurality of secondary devices are connected to the UE.

Example 27 is the method of Example 26, wherein the first value is less than the second value.

Example 28 may include an apparatus comprising means to perform one or more elements of a method described in or related to any of the above Examples, or any other method or process described herein.

Example 29 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 30 may include an apparatus comprising logic, modules, or circuitry to perform one or more elements of a method described in or related to any of the above Examples, or any other method or process described herein.

Example 31 may include a method, technique, or process as described in or related to any of the above Examples, or portions or parts thereof.

Example 32 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 33 may include a signal as described in or related to any of the above Examples, or portions or parts thereof.

Example 34 may include a datagram, packet, frame, segment, protocol data unit (PDU), or message as described in or related to any of the above Examples, or portions or parts thereof, or otherwise described in the present disclosure.

Example 35 may include a signal encoded with data as described in or related to any of the above Examples, or portions or parts thereof, or otherwise described in the present disclosure.

Example 36 may include a signal encoded with a datagram, packet, frame, segment, PDU, or message as described in or related to any of the above Examples, or portions or parts thereof, or otherwise described in the present disclosure.

Example 37 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 38 may include a computer program comprising instructions, wherein execution of the program by a processing element is to cause the processing element to carry out the method, techniques, or process as described in or related to any of the above Examples, or portions thereof.

Example 39 may include a signal in a wireless network as shown and described herein.

Example 40 may include a method of communicating in a wireless network as shown and described herein.

Example 41 may include a system for providing wireless communication as shown and described herein.

Example 42 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to extend connectivity with a cellular network, the method comprising:
   determining a maximum number of extensions to allow in an extension activity period associated with an amount of time during which the UE is in a Radio Resource control (RRC) connected mode, wherein the maximum number of extensions is determined based on a number of secondary devices connected to the cellular network through the UE; and during the extension activity period, in response to detecting traffic from a secondary device and in response to determining that the maximum number of extensions has not been reached during the extension activity period, before expiration of an inactivity period, initiating signaling activity with a radio access network (RAN) node of a serving cell.

2. The method of claim 1, wherein the signaling activity with the RAN node of the serving cell is according to an extension comprising a plurality of pings.

3. The method of claim 1, wherein the initiating signaling activity with the RAN node of the serving cell is further in response to a determination that no user data or signaling packet has been sent between the UE and the RAN node during a pre-determined period that is less than the inactivity period.

4. The method of claim 1, further comprising modifying a value of a counter corresponding to the signaling activity with the RAN node of the serving cell, and wherein at least a portion of the signaling activity with the RAN node of the serving cell occurs further in response to a determination that the value of the counter has not reached a final value.

5. The method of claim 1, wherein the maximum number of extensions to allow in the extension activity period is determined to be a first value when a single secondary device is connected to the cellular network through the UE, and wherein the maximum number of extensions to allow in the extension activity period is determined to be a second value when a plurality of secondary devices are connected to the cellular network through the UE.

6. The method of claim 5, wherein the first value is less than the second value.

7. A non-transitory computer-readable storage medium, the computer-readable storage medium including instructions that when executed by a processor of a user equipment (UE), cause the processor to:

determine a maximum number of extensions to allow in an extension activity period associated with an amount of time during which the UE is in a Radio Resource control (RRC) connected mode, wherein the maximum number of extensions is determined based on a number of secondary devices connected to a cellular network through the UE; and during the extension activity period, in response to detecting traffic from a secondary device and in response to determining that the maximum number of extensions has not been reached during the extension activity period, before expiration of an inactivity period, initiate signaling activity with a radio access network (RAN) node of a serving cell.

8. The non-transitory computer-readable storage medium of claim 7, wherein the signaling activity with the RAN node of the serving cell is according to an extension comprising a plurality of pings.

9. The non-transitory computer-readable storage medium of claim 7, wherein the initiating signaling activity with the RAN node of the serving cell is further in response to a determination that no user data or signaling packet has been sent between the UE and the RAN node during a pre-determined period that is less than the inactivity period.

10. The non-transitory computer-readable storage medium of claim 7, wherein the instructions further cause the processor to modify a value of a counter corresponding to the signaling activity with the RAN node of the serving cell, and wherein at least a portion of the signaling activity with the RAN node of the serving cell occurs further in response to a determination that the value of the counter has not reached a final value.

11. The non-transitory computer-readable storage medium of claim 7, wherein the maximum number of extensions to allow in the extension activity period is determined to be a first value when a single secondary device is connected to the cellular network through the UE, and wherein the maximum number of extensions to allow in the extension activity period is determined to be a second value when a plurality of secondary devices are connected to the cellular network through the UE.

12. The non-transitory computer-readable storage medium of claim 11, wherein the first value is less than the second value.

13. A user equipment (UE), comprising:
a memory device; and
a processor in communication with the memory device, the processor configured to:
determine a maximum number of extensions to allow in an extension activity period associated with an amount of time during which the UE is in a Radio Resource control (RRC) connected mode, wherein the maximum number of extensions is determined based on a number of secondary devices connected to a cellular network through the UE; and
during the extension activity period, in response to detecting traffic from a secondary device and in response to determining that the maximum number of extensions has not been reached during the extension activity period, before expiration of an inactivity period, initiate signaling activity with a radio access network (RAN) node of a serving cell.

14. The UE of claim 13, wherein the signaling activity with the RAN node of the serving cell is according to an extension comprising a plurality of pings.

15. The UE of claim 13, wherein the initiating signaling activity with the RAN node of the serving cell is further in response to a determination that no user data or signaling packet has been sent between the UE and the RAN node during a pre-determined period that is less than the inactivity period.

16. The UE of claim 13, wherein processor is further configured to modify a value of a counter corresponding to the signaling activity with the RAN node of the serving cell, and wherein at least a portion of the signaling activity with the RAN node of the serving cell occurs further in response to a determination that the value of the counter has not reached a final value.

17. The UE of claim 13, wherein the maximum number of extensions to allow in the extension activity period is determined to be a first value when a single secondary device is connected to the cellular network through the UE, and wherein the maximum number of extensions to allow in the extension activity period is determined to be a second value when a plurality of secondary devices are connected to the cellular network through the UE.

18. The UE of claim 17, wherein the first value is less than the second value.

* * * * *